(12) United States Patent
Gharib et al.

(10) Patent No.: US 11,639,634 B2
(45) Date of Patent: May 2, 2023

(54) RADIAL BEARING APPARATUS FOR USE WITH SIDE FORCES

(71) Applicant: Halliburton Energy Services, Inc., Houston, TX (US)

(72) Inventors: Hossam Gharib, Edmonton (CA); Steven Graham Bell, Red Deer (CA)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 80 days.

(21) Appl. No.: 17/367,968

(22) Filed: Jul. 6, 2021

(65) Prior Publication Data

US 2021/0332645 A1 Oct. 28, 2021

Related U.S. Application Data

(62) Division of application No. 16/470,491, filed as application No. PCT/CA2018/051426 on Nov. 9, 2018, now Pat. No. 11,085,240.

(60) Provisional application No. 62/711,314, filed on Jul. 27, 2018.

(51) Int. Cl.
| | | |
|---|---|---|
| *E21B 4/00* | (2006.01) | |
| *F16C 17/02* | (2006.01) | |
| *F16C 33/04* | (2006.01) | |
| *E21B 7/06* | (2006.01) | |

(52) U.S. Cl.
CPC .............. *E21B 4/003* (2013.01); *F16C 17/02* (2013.01); *F16C 33/04* (2013.01); *E21B 7/062* (2013.01); *E21B 7/068* (2013.01); *F16C 2352/00* (2013.01)

(58) Field of Classification Search
CPC .......... E21B 4/003; E21B 7/062; E21B 7/068; F16C 17/02; F16C 33/04; F16C 2352/00
See application file for complete search history.

(56) References Cited

U.S. PATENT DOCUMENTS

| | | |
|---|---|---|
| 4,940,002 A | 7/1990 | Bien |
| 4,995,735 A | 2/1991 | Dansdill |
| 5,372,433 A | 12/1994 | Nakanishi et al. |
| 5,913,608 A | 6/1999 | Blume |
| 7,055,439 B2 | 6/2006 | Bien et al. |
| 8,360,648 B2 | 1/2013 | Maruyama et al. |
| 8,545,102 B2 | 10/2013 | Hayashi et al. |

(Continued)

FOREIGN PATENT DOCUMENTS

| | | |
|---|---|---|
| AT | 107213 B | 9/1927 |
| CA | 2928055 A1 | 10/2016 |

(Continued)

*Primary Examiner* — Taras P Bemko
(74) *Attorney, Agent, or Firm* — Parlee McLaws LLP; Patrick Laycock; Craig Roddy

(57) ABSTRACT

A radial bearing apparatus including a housing with a housing bore defining a radial bearing housing surface, a shaft extending through the housing bore and defining a radial bearing shaft surface, and a radial bearing contact interface between the radial bearing housing surface and the radial bearing shaft surface for bearing a variable side force applied to the shaft. The radial bearing contact interface includes an oblique section in which the radial bearing housing surface and the radial bearing shaft surface are oblique to each other when the side force is zero and progressively increase in contact in an axial direction in response to an increasing magnitude of the side force.

22 Claims, 7 Drawing Sheets

(56) References Cited

U.S. PATENT DOCUMENTS

| | | | |
|---|---|---|---|
| 10,633,919 B2 | 4/2020 | Ritchie et al. | |
| 2004/0126039 A1 | 7/2004 | Kashiyama et al. | |
| 2011/0164840 A1 | 7/2011 | Hayashi et al. | |
| 2016/0312535 A1* | 10/2016 | Ritchie | F16C 33/26 |
| 2018/0112465 A1* | 4/2018 | Ritchie | F16C 35/02 |

FOREIGN PATENT DOCUMENTS

| | | |
|---|---|---|
| EP | 1717466 A2 | 11/2006 |
| FR | 2544375 A1 | 10/1984 |
| GB | 1380947 | 1/1975 |
| GB | 2269212 A | 2/1994 |
| JP | 11037157 A | 2/1999 |
| WO | 2013005032 A1 | 1/2013 |
| WO | 2018075991 A1 | 4/2018 |

\* cited by examiner

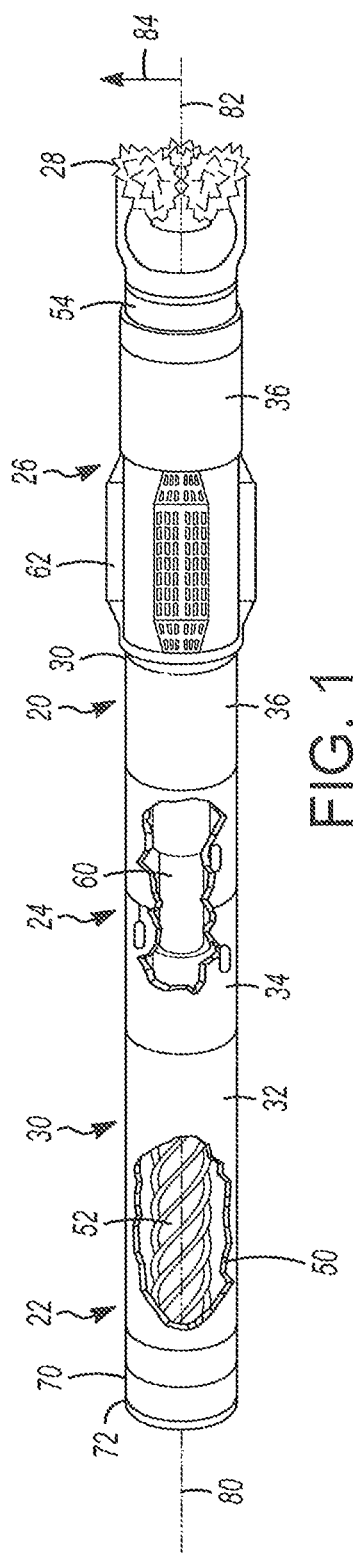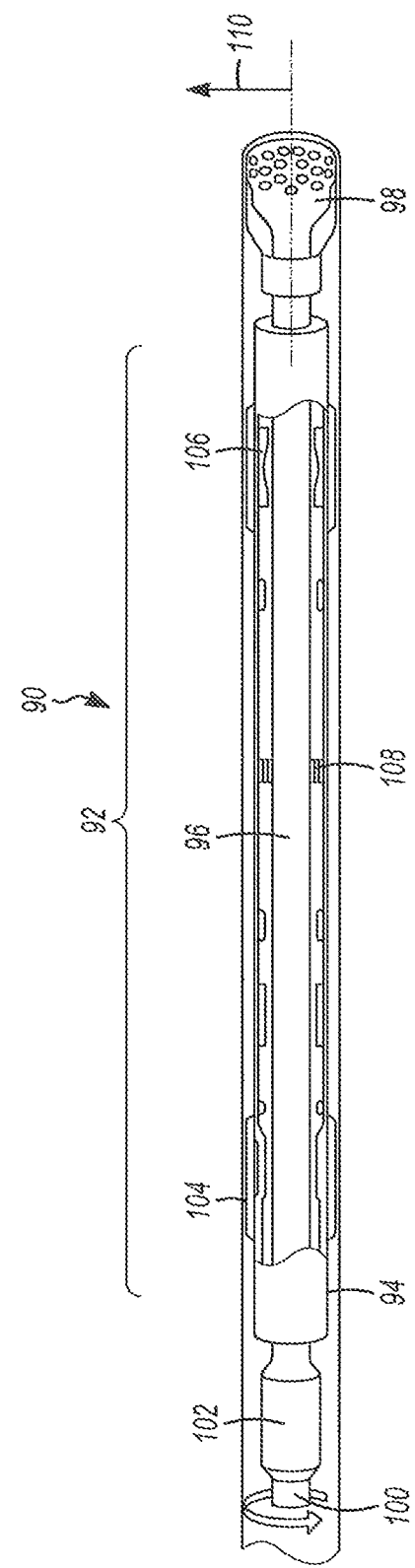

RADIAL BEARING APPARATUS FOR USE WITH SIDE FORCES

CROSS-REFERENCE TO RELATED APPLICATIONS

This application is a divisional patent application of co-pending U.S. patent application Ser. No. 16/470,491, filed on Jun. 17, 2019 which is a 371 national phase application of International Application No. PCT/CA2018/051426, filed Nov. 9, 2018, and which claims the benefit under 35 U.S.C. § 199(e) of U.S. Provisional Patent Application No. 62/711,314, filed Jul. 27, 2018, the entire disclosures of each of which are hereby incorporated herein by reference.

TECHNICAL FIELD

A radial bearing apparatus with oblique radial bearing surfaces.

BACKGROUND OF THE DISCLOSURE

Bearings may be used to support rotating and/or reciprocating components radially and/or axially. Examples of bearings include radial bearings for resisting radial loads and thrust bearings for supporting axial loads. Bearings may be provided in various bearing configurations in rotating and/or reciprocating equipment for at least partially supporting radial and/or axial loads. Such bearings may be used in the oil and gas industry, where holes may be drilled in subterranean formations using rotating and/or reciprocating equipment. Radial bearings in subterranean applications may experience large radial loads such as side forces. Side forces may cause wear and/or failure of radial bearings.

BRIEF DESCRIPTION OF DRAWINGS

Embodiments will now be described with reference to the accompanying drawings, in which:

FIG. 1 is a pictorial view of a drilling motor for use in drilling a borehole.

FIG. 2 is a pictorial view of a rotary steerable drilling apparatus for use in drilling a borehole.

BRIEF SUMMARY OF THE INVENTION

Figure 3:
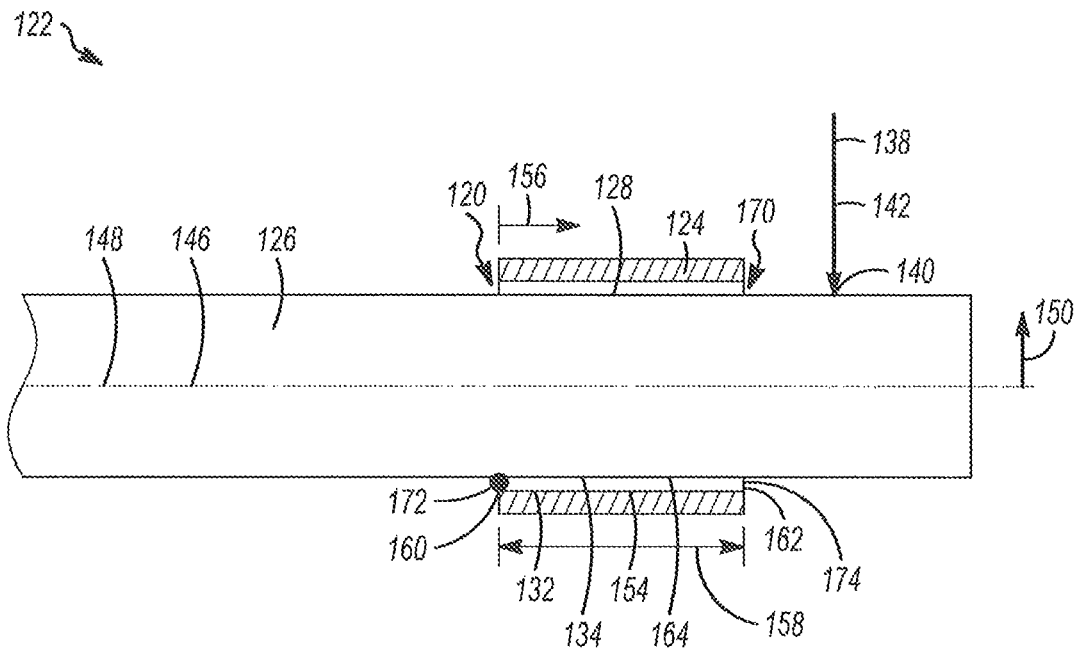
FIG. 3 is a simplified schematic side view of a first exemplary embodiment of an apparatus including a radial bearing apparatus, wherein a single oblique section of the radial bearing contact interface is provided by a relative tilt between the radial bearing housing surface and the radial bearing shaft surface, and wherein a relatively large side force has been applied to the shaft.

This description is directed, in part, to a radial bearing apparatus for performing the functions of a radial bearing, and to apparatus comprising the radial bearing apparatus.

The radial bearing apparatus may be used in any environment and/or in any apparatus in which a radial bearing may be provided for radial support. The radial bearing apparatus may be particularly suited for use in environments and/or in apparatus in which the radial bearing is expected to bear significant side forces.

An apparatus may comprise a single radial bearing or may comprise a plurality of radial bearings. A single radial bearing or a plurality of radial bearings may be included in a bearing assembly. A bearing assembly may be contained in a bearing section of an apparatus. A bearing assembly and/or a bearing section of an apparatus may be located at any position in an apparatus. As a non-limiting example, a bearing assembly and/or a bearing section of an apparatus may be located adjacent to a distal end of an apparatus.

One, more than one, or all of the radial bearings in an apparatus may comprise, consist of, or consist essentially of the radial bearing apparatus. The radial bearing apparatus may be located at any position in the apparatus and/or at any axial location along a length of the apparatus where a radial bearing may be desired. As non-limiting examples, the radial bearing apparatus may be provided as a lower radial bearing or an upper radial bearing in a bearing assembly and/or in a bearing section of the apparatus.

As a non-limiting example, the radial bearing apparatus may be included as a component of an apparatus which is configured to be inserted into a borehole, in which case the apparatus may be any suitable apparatus which may be inserted into a borehole for any purpose. As non-limiting examples, the apparatus may be an apparatus for use in drilling, completing, servicing, logging, or surveying a borehole.

As a non-limiting example, the apparatus may be a drilling system for use in drilling a borehole. As non-limiting examples, a drilling system may comprise drill pipe, a downhole drilling motor, a rotary steerable drilling apparatus, a turbine, a reciprocating hammer, and/or any other structure, device, or apparatus which may be used in the drilling of a borehole.

A drilling motor may be a straight drilling motor or a directional drilling motor which provides a fixed or adjustable driveshaft tilt angle of a driveshaft for directional drilling. The driveshaft tilt angle may be an angle of the driveshaft of the directional drilling motor relative to a primary axis of the directional drilling motor, which may be provided by a bend in a housing of the directional drilling motor, by a redirection of the driveshaft within the directional drilling motor, or in any other suitable manner. The driveshaft tilt angle may be in a shaft tilt direction.

A straight drilling motor may depend upon the integrity of bearing surfaces for proper operation of the drilling motor. Wear and/or fracture of bearing surfaces may cause premature failure of the drilling motor, which may require a suspension of drilling operations in order to repair or replace the drilling motor.

A directional drilling motor may further depend upon the integrity of bearing surfaces to maintain the driveshaft tilt angle relative to the primary axis of the directional drilling motor. Wear and/or fracture of bearing surfaces may cause a reduction in the driveshaft tilt angle, thus potentially degrading performance of the drilling motor and potentially reducing the service life of the drilling motor.

Both straight drilling motors and directional drilling motors may be subjected to significant side forces on the driveshaft and/or the drill bit. Side forces may result from the interaction of a drilling motor with the surrounding environment of the borehole. A side force may be applied to the driveshaft and/or the drill bit at a side force axial position in a side force direction. In the case of a directional drilling motor, the side force direction may be identical, opposite, or oblique to the shaft tilt direction, depending upon the configuration and mode of use of the drilling motor.

The radial bearing apparatus comprises interfacing radial bearing surfaces. The radial bearing surfaces may be rotatable, reciprocable, or otherwise movable relative to each other. A radial bearing contact interface is provided between the radial bearing surfaces for bearing a side force.

The radial bearing contact interface comprises at least one oblique section along which the bearing surfaces are arranged to be generally oblique to each other in an axial direction when the side force is zero. The bearing surfaces are arranged to become generally less oblique to each other within a range along an oblique section as the side force increases from zero.

An oblique section may have a vertex. The vertex may be defined by an axial location of maximum convergence of the oblique bearing surfaces along the oblique section. The gap between the oblique bearing surfaces at the vertex may be zero, minimal, or substantial, depending upon the configuration of the oblique section. A bearing interface angle may be defined between the bearing surfaces at the vertex of an oblique section.

The bearing interface angle may be generally larger than zero when a side force applied to a component of the radial bearing apparatus is zero. The bearing interface angle may tend generally to decrease within an angular range as the side force increases from zero. The bearing interface angle is described as being "generally" larger than zero when the side force is zero because the bearing interface angle is dependent in part upon the configuration and overall shape of the bearing surfaces. The bearing interface angle is described as tending "generally" to decrease within a range when the side force increases from zero because the bearing interface angle may not decrease linearly or evenly in response to the side force.

The radial bearing surfaces may be arranged to be generally oblique to each other in any suitable manner. As non-limiting examples, the radial bearing surfaces may be arranged to be generally oblique to each other by providing a longitudinal tilt of one or both of the radial bearing surfaces relative to each other, by providing a flare (expansion) of one or both of the radial bearing surfaces, and/or by providing a taper (narrowing) of one or both of the radial bearing surfaces. The radial bearing surfaces are described as being "generally" oblique to each other because it is contemplated that some portions of the radial bearing surfaces within the oblique section may not be oblique to each other when the radial bearing surfaces are arranged to be generally oblique to each other.

A flare of a radial bearing surface may have any shape which provides a generally expanding radial bearing surface. A flare may be provided as a straight surface, a curved surface, or as a combination of one or more straight and curved surfaces. A flare may be constructed integrally with a radial bearing surface or may be permanently or removably connected with a radial bearing surface in a suitable manner. As a non-limiting example, a flare may comprise, consist of, or consist essentially of an expanding section of a tubular radial bearing surface such as a sleeve.

A taper in a radial bearing surface may have any shape which provides a generally narrowing radial bearing surface. A taper may be provided as a straight surface, a curved surface, or as a combination of one or more straight and curved surfaces. A taper may be constructed integrally with a radial bearing surface or may be permanently or removably connected with a radial bearing surface in a suitable manner. As a non-limiting example, a taper may comprise, consist of, or consist essentially of a narrowing section of a cylindrical radial bearing surface such as a shaft.

The radial bearing surfaces may become generally less oblique to each other as the side force increases from zero because of tilting or bending of one or both of the radial bearing surfaces relative to each other as a reaction to the application of the side force. The radial bearing surfaces may pivot, tilt, or bend relative to each other about the vertex of an oblique section. The radial bearing surfaces are described as becoming "generally" less oblique to each other as the side force increases from zero because a radial bearing surface may not tilt or bend linearly or evenly in response to the side force.

The range within which the radial bearing surfaces tend to become generally less oblique and the angular range within which the bearing interface angle tends generally to decrease as the side force increases from zero may be dependent upon such non-limiting factors as the configuration of the radial bearing surfaces, the material properties of the radial bearing surfaces, the location of application of the side force, and the magnitude of the side force. As a non-limiting example, if the side force increases to exceed a magnitude which defines the end of the range, the radial bearing surfaces may actually become more oblique to each other in the axial direction and/or the bearing interface angle may actually increase. The ability of the radial bearing apparatus to accommodate a side force exceeding a magnitude which defines the end of a range and an angular range may in some circumstances be enhanced by arranging the radial bearing contact interface to comprise a plurality of interface sections.

The radial bearing contact interface facilitates a contact area between the radial bearing surfaces. As the radial bearing surfaces tend to become generally less oblique to each other within a range and/or the bearing interface angle tends generally to decrease within an angular range, the contact area between the radial bearing surfaces may tend generally to increase within a range, may tend generally to be maintained within a range, and/or may shift within the radial bearing contact interface. The contact area may tend "generally" to increase within a range because a radial bearing surface may not tilt or bend linearly or evenly in response to the side force, with the result that the contact area may not necessarily increase in response to the application of a side force.

A progressive increase in the contact area in response to the application of a variable side force may enable the radial bearing apparatus to accommodate a higher side force and/or to experience reduced wear in response to the application of an increasing magnitude of the side force. Maintaining the contact area in response to the application of a side force may be preferable to a reduction in contact area which may occur in a radial bearing upon the application of a side force if the radial bearing surfaces are substantially parallel and aligned when no side force is applied. Shifting the contact area within the radial bearing contact interface in response to the application of a side force may facilitate distribution of forces and wear to different areas of the radial bearing contact interface depending upon the magnitude and manner of application of the side force.

A radial bearing surface may comprise, consist of, or consist essentially of any structure, device, or apparatus which is capable of providing a radial bearing surface. As non-limiting examples, a radial bearing surface may comprise, consist of, or consist essentially of a radial bearing component which comprises and/or defines a radial bearing surface or a coating which provides a radial bearing surface. Alternatively, a radial bearing surface may be defined by or in a component of an apparatus in which the radial bearing apparatus is used.

A radial bearing surface may be a straight surface, a curved surface, or may be a combination of straight and curved surfaces. As non-limiting examples, a radial bearing surface may be provided as a sequence of discrete straight surfaces, as one or more continuous curved surfaces which may have a constant or variable radius of curvature, or as a sequence of discrete straight surfaces connected by one or more curved surfaces.

A radial bearing surface may comprise, consist of, or consist essentially of any structure and/or device or any combination of structures and/or devices which is suitable for use in a radial bearing, including as non-limiting examples, plain bearing surfaces and/or rolling elements. A radial bearing surface may comprise, consist of, or consist essentially of any material or combination of materials which is suitable for use in a radial bearing, including as non-limiting examples, metals or composite materials such as alloys and ceramics.

Interfacing radial bearing surfaces may have similar or different wear properties. As a non-limiting example, one interfacing radial bearing surface may be configured to wear relatively more easily than the other interfacing radial bearing surface in order to provide preferential wear of a radial bearing surface and/or to provide a sacrificial radial bearing surface.

Interfacing radial bearing surfaces may have uniform or variable wear properties. As a non-limiting example, a radial bearing surface may define one or more areas which may be relatively more or less wearable. As a non-limiting example, an area of a radial bearing surface which is expected to bear relatively higher forces and/or relatively constant forces may be configured to wear relatively less easily than other areas of the radial bearing surface.

The radial bearing apparatus may consist or consist essentially of the radial bearing surfaces, or the radial bearing apparatus may comprise one or more additional components. One or both of the radial bearing surfaces may be connected with, may be integral with, or may be otherwise associated with an additional component of the radial bearing apparatus.

As a non-limiting example, the radial bearing apparatus may comprise a housing. The housing may comprise, consist of, or consist essentially of any suitable structure which is capable of performing a housing function. The housing may comprise a single unitary housing component or the housing may comprise a plurality of housing components which are connected together. The housing may define a housing bore. The housing may comprise a radial bearing housing surface as a radial bearing surface. The radial bearing housing surface may be within the housing bore.

The radial bearing housing surface may be provided in any suitable manner, and may be arranged to be connected with, integral with, or otherwise associated with the housing in any suitable manner. As a non-limiting example, the radial bearing housing surface may be provided by a radial bearing housing component such as an insert or a sleeve which may be connected with the housing by welding, by one or more fasteners, by an interference fit, or in any other suitable manner. As a non-limiting example, the radial bearing housing surface may be provided as a coating on the housing bore, which may be applied in any suitable manner. As a non-limiting example, the radial bearing housing surface may be formed integrally with the housing at the time of fabrication of the housing. As a non-limiting example, the radial bearing housing surface may be provided by one or more suitable treatment processes which may be applied to the housing bore or to a radial bearing housing component.

As a non-limiting example, the radial bearing apparatus may comprise a shaft. The shaft may comprise, consist of, or consist essentially of any structure which is capable of performing the functions of a shaft. The shaft may comprise a single unitary shaft component or the shaft may comprise a plurality of shaft components which are connected together. The shaft may be solid or the shaft may define a shaft bore. As non-limiting examples, the shaft may comprise a driveshaft or a driven shaft, or may be connected directly or indirectly with a driveshaft or a driven shaft. The shaft may extend through the housing bore. The shaft may extend through the housing bore so that the shaft is rotatable, reciprocable, or otherwise movable relative to the housing. The shaft may comprise a radial bearing shaft surface as a radial bearing surface. The radial bearing shaft surface may be on an exterior of the shaft.

The radial bearing shaft surface may be provided in any suitable manner, and may be arranged to be connected with, integral with, or otherwise associated with the shaft in any suitable manner. As a non-limiting example, the radial bearing shaft surface may be provided by a radial bearing shaft component such as an outsert or a sleeve which may be connected with the shaft by welding, by one or more fasteners, by an interference fit, or in any other suitable manner. As a non-limiting example, the radial bearing shaft surface may be provided as a coating on the shaft, which may be applied in any suitable manner. As a non-limiting example, the radial bearing shaft surface may be formed integrally with the shaft at the time of fabrication of the shaft. As a non-limiting example, the radial bearing shaft surface may be provided by one or more suitable treatment processes which may be applied to the shaft or to a radial bearing shaft component.

The radial bearing housing surface and the radial bearing shaft surface may have any shape and configuration which facilitates the desired relative movement between the housing and the shaft. As a non-limiting example, the radial bearing housing surface and the radial bearing shaft surface may be generally cylindrical in order to facilitate rotation of the shaft relative to the housing.

The radial bearing housing surface and the radial bearing shaft surface may each comprise, consist of, or consist essentially of any structure or combination of structures which is suitable for use in a radial bearing, including as non-limiting examples, plain bearing surfaces and/or rolling elements. The radial bearing housing surface and the radial bearing shaft surface may each comprise, consist of, or consist essentially of any material or combination of materials which is suitable for use in a radial bearing, including as non-limiting examples, metals or composite materials such as alloys and ceramics.

The radial bearing housing surface and the radial bearing shaft surface may have similar wear properties. Alternatively, the radial bearing housing surface and the radial bearing shaft surface may have different wear properties. As a non-limiting example, one of the radial bearing housing surface or the radial bearing shaft surface may be configured to wear relatively more easily than the other in order to provide preferential wear of a bearing surface and/or to provide a sacrificial bearing surface.

The radial bearing housing surface and/or the radial bearing shaft surface may have uniform or variable wear properties. As a non-limiting example, the radial bearing housing surface and/or the radial bearing shaft surface may define one or more areas which may be relatively more or less wearable. As a non-limiting example, an area of the radial bearing housing surface and/or the radial bearing shaft surface which is expected to bear relatively higher forces and/or relatively constant forces may be configured to wear relatively less easily than other areas of the bearing surface.

A radial bearing contact interface is defined between the radial bearing housing surface and the radial bearing shaft surface. The radial bearing contact interface is provided for bearing a side force which is applied to the shaft in a side force direction. The side force may tend to move the shaft transversely within the housing bore in the side force direction. As a result, if the side force applied to the shaft is a pushing force against the shaft the radial bearing contact interface may generally be on an opposite side of the radial bearing apparatus (i.e., 180 degrees around the circumference of the shaft) from the location of application of the pushing side force. The radial bearing contact interface and its location may therefore be defined at least in part by the side force direction.

As a first non-limiting example, the radial bearing apparatus may be a component of an apparatus having a primary axis and comprising a shaft, wherein the shaft of the apparatus is tilted relative to the primary axis in a shaft tilt direction. In such circumstances, the side force may be exerted against the tilt of the shaft by the environment surrounding the apparatus such that the shaft tilt direction is opposite to the side force direction. In the first non-limiting example, the side force direction may vary relative to the surrounding environment as the orientation of the apparatus in the surrounding environment changes, but may be constant relative to the apparatus and continue to be opposite to the shaft tilt direction so that the radial bearing contact interface is potentially always at the same circumferential location in the radial bearing apparatus (i.e., on the opposite side of the radial bearing apparatus from the shaft tilt direction). As a result, in the first non-limiting example, the circumferential location of the radial bearing contact interface may potentially be constant around only a portion of the circumference of the radial bearing apparatus on the opposite side of the radial bearing apparatus from the shaft tilt direction, so that the radial bearing contact interface may potentially be circumferentially asymmetrical within the radial bearing apparatus.

As a second non-limiting example, the radial bearing apparatus may be a component of an apparatus having a primary axis and comprising a shaft, wherein the shaft of the apparatus may be substantially concentric with and/or substantially parallel to the primary axis of the apparatus. In such circumstances, the side force direction may depend upon the orientation and positioning of the apparatus in the environment surrounding the apparatus. In the second non-limiting example, the side force direction may vary relative to the apparatus as the orientation of the apparatus in the surrounding environment changes, and the circumferential location of the radial bearing contact interface in the radial bearing apparatus may potentially vary as the orientation of the apparatus changes and the side force direction varies relative to the apparatus. As a result, in the second non-limiting example, the circumferential location of the radial bearing contact interface may potentially extend around the entire circumference of the radial bearing apparatus, and the radial bearing contact interface may be required to be circumferentially symmetrical within the radial bearing apparatus.

The radial bearing contact interface extends in the axial direction for an interface length within the housing bore. The radial bearing contact interface may extend in the axial direction between a first interface end and a second interface end. The interface length is the maximum length of contact between the radial bearing housing surface and the radial bearing shaft surface and may be defined at least in part by the shape, dimensions, and configuration of the radial bearing surfaces.

The radial bearing contact interface also extends circumferentially within the housing bore for an interface width within the housing bore. The interface width is the maximum width of contact between the radial bearing housing surface and the radial bearing shaft surface and is defined by the shape, dimensions, and configuration of the radial bearing surfaces.

The interface length multiplied by the interface width represents a maximum contact area between the radial bearing housing surface and the radial bearing shaft surface when the radial bearing housing surface and the radial bearing shaft surface are in contact with each other along the entire interface length and the entire interface width. The contact area between the radial bearing housing surface and the radial bearing shaft surface is less than the maximum contact area when the side force applied to the shaft is zero, and the contact area may tend generally to increase within a range as the side force increases from zero and the length of contact between the bearing surfaces tends generally to increase within a range.

The radial bearing contact interface comprises at least one oblique section along which the radial bearing housing surface and the radial bearing shaft surface are arranged to be generally oblique to each other in the axial direction when the side force is zero. The radial bearing housing surface and the radial bearing shaft surface are arranged to become generally less oblique to each other within a range along an oblique section as the side force increases from zero.

An oblique section may have a vertex. The vertex may be defined by an axial location of maximum convergence of the radial bearing housing surface and the radial bearing shaft surface along the oblique section. The gap between the radial bearing housing surface and the radial bearing shaft surface at the vertex may be zero, minimal, or substantial, depending upon the configuration of the oblique section.

The radial bearing housing surface and the radial bearing shaft surface may or may not contact each other at the vertex when the side force is zero. If the radial bearing housing surface and the radial bearing shaft surface do not contact each other at the vertex when the side force is zero, the gap between the radial bearing housing surface and the radial bearing shaft surface at the vertex when the side force is zero may be minimal or substantial, depending upon the configuration of the oblique section.

A bearing interface angle may be defined between the radial bearing housing surface and the radial bearing shaft surface at the vertex of an oblique section. The bearing interface angle may be generally larger than zero when a side force applied to the shaft is zero. As a result, when the side force applied to the shaft is zero, the length of contact between the radial bearing housing surface and the radial bearing shaft surface may either be zero or may be confined to a small portion of the interface length and the contact area between the bearing surfaces may either be zero or may be relatively small.

The bearing interface angle along the interface length may tend generally to decrease within an angular range as the side force increases from zero. The decrease in the bearing interface angle may occur as the shaft is deflected within the housing bore by the side force and tilts and/or bends within the housing bore to decrease the bearing interface angle. As the side force increases from zero, the length of contact between the radial bearing housing surface and the radial bearing shaft surface may tend generally to increase within a range to include a larger portion of the interface length and the contact area between the radial bearing surfaces may also tend generally to increase within a range, may tend generally to be maintained within a range, and/or may be shifted within the radial bearing contact interface.

The side force may be applied directly or indirectly to the shaft at a side force axial position. The side force axial position may be axially located at any position on the shaft or on a structure connected with the shaft. As a non-limiting example, the shaft may have a protruding length which extends from the housing and the side force axial position may be axially located at any position along the protruding length. As a non-limiting example, the shaft may be connected with a shaft of an apparatus and the side force axial position may be axially located along the shaft of the apparatus so that the side force is applied indirectly to the shaft via the shaft of the apparatus.

An oblique section of the radial bearing contact interface may extend from the vertex of the oblique section toward the side force axial position so that the application of the side force tends to cause the radial bearing housing surface and the radial bearing shaft surface to become generally less oblique and/or tends to close or decrease the bearing interface angle.

The radial bearing housing surface and the radial bearing shaft surface may be arranged to be generally oblique to each other in any suitable manner. As non-limiting examples, the radial bearing housing surface and the radial bearing shaft surface may be arranged to be generally oblique to each other by providing a tilt of the radial bearing housing surface relative to the radial bearing shaft surface, by providing a tilt of the radial bearing shaft surface relative to the radial bearing housing surface, by providing a flare (expansion) of one or both of the radial bearing surfaces, by providing a taper (narrowing) of one or both of the radial bearing surfaces, and/or in any other suitable manner. As non-limiting examples, the radial bearing housing surface and the radial bearing shaft surface may be arranged to be generally oblique to each other by shaping and/or configuring the bearing surfaces themselves to be generally oblique, by shaping and/or configuring a radial bearing housing component and/or a radial bearing shaft component so that the bearing surfaces are generally oblique, and/or by shaping and/or configuring the housing and/or the shaft so that the bearing surfaces are generally oblique.

The radial bearing housing surface and the radial bearing shaft surface may be straight surfaces, curved surfaces, or may be a combination of straight and curved surfaces.

The amount of the obliqueness of the radial bearing housing surface and the radial bearing shaft surface along an oblique section and the number of oblique sections along the radial bearing contact interface may be selected to accommodate a desired range of magnitudes of a side force under the operating conditions of the apparatus in which the radial bearing apparatus is used. As non-limiting examples, the amount of obliqueness of the radial bearing surfaces and the number of oblique sections may be selected based upon an expected magnitude of the side force, an expected side force axial position, an expected side force direction, the configuration of the apparatus in which the radial bearing apparatus is used, and/or the mode of operation of the apparatus in which the radial bearing apparatus is used.

The radial bearing contact interface may consist of or consist essentially of an oblique section as a single interface section, or the radial bearing contact interface may comprise any number of a plurality of interface sections arranged along the radial bearing contact interface. An interface section may be an oblique section or may be a non-oblique section. A plurality of interface sections may be distinguished from each other by different configurations of the radial bearing surfaces and/or the radial bearing contact interface, by different lengths or widths, by different amounts of obliqueness and different bearing interface angles, and/or by different properties of the radial bearing surfaces, and may be arranged in any suitable manner. As non-limiting examples, the bearing surfaces in a plurality of interface sections may be constructed of different materials and/or may comprise different bearing structures (such as plain bearing surfaces and/or rolling elements).

Arranging the radial bearing contact interface to comprise a plurality of interface sections may potentially provide the radial bearing apparatus with increased capability to accommodate a broader range of magnitudes of the side force than a radial bearing contact interface having a single interface section. A plurality of oblique sections and/or interface sections with different lengths, widths, bearing surface materials, and/or bearing structures may facilitate a plurality of ranges of side forces which can be accommodated by the radial bearing apparatus, and/or may enable the radial bearing apparatus to accommodate larger side forces and/or a larger range of magnitude of side forces.

The radial bearing contact interface may be arranged to comprise a plurality of interface sections in any suitable manner. As non-limiting examples, two or more oblique sections may be connected with each other, two or more non-oblique sections may be connected together, an oblique section may be connected with a non-oblique section, a non-oblique section may be interposed between two oblique sections, or an oblique section may be interposed between two non-oblique sections.

As non-limiting examples, a plurality of interface sections may be provided by straight surfaces, curved surfaces, or a combination of straight and curved surfaces. As non-limiting examples, a plurality of interface sections may be provided as a sequence of discrete straight surfaces, as one or more continuous curved surfaces which may have a constant or variable radius of curvature, or as a sequence of discrete straight surfaces connected by one or more curved surfaces. A transition or interface between adjacent interface sections may be provided by straight surfaces, curved surfaces, or a combination of straight and curved surfaces.

As a non-limiting example, the radial bearing contact interface may comprise a first interface section and a second interface section arranged end to end along the interface length, wherein the first interface section and the second interface section have different configurations. The second interface section may be axially located between the first interface section and the side force axial position.

The first interface section and the second interface section may be configured in any suitable manner to provide different configurations. As non-limiting examples, the first radial bearing contact interface and the second radial bearing contact interface may be configured to have different amounts of obliqueness and different bearing interface angles and/or may be configured to have different interface lengths, may be constructed from different bearing materials, and/or may comprise different bearing structures such as plain bearing surfaces and rolling elements.

As a non-limiting example, the first interface section may be a first oblique section, wherein the radial bearing housing surface and the radial bearing shaft surface are arranged to be oblique to each other in the axial direction along the first oblique section when a side force is zero, and wherein the radial bearing housing surface and the radial bearing shaft surface are arranged to become generally less oblique to each other with a first range as the side force increases from zero. The first oblique section may have a first vertex. A first bearing interface angle may be defined between the radial bearing housing surface and the radial bearing shaft surface at the first vertex. The first oblique section may have a first oblique section length. The first bearing interface angle may tend generally to decrease within a first angular range as the side force increases from zero.

As a non-limiting example, the second interface section may be a second oblique section, wherein the radial bearing housing surface and the radial bearing shaft surface are arranged to be oblique to each other in the axial direction along the second oblique section when a side force is zero, and wherein the radial bearing housing surface and the radial bearing shaft surface are arranged to become generally less oblique to each other with a second range as the side force increases from zero. The second oblique section may have a second vertex. A second bearing interface angle may be defined between the radial bearing housing surface and the radial bearing shaft surface at the second vertex. The second oblique section may have a second oblique section length. The second bearing interface angle may tend generally to decrease within a first angular range as the side force increases from zero.

The first oblique section and the second oblique section may be arranged relative to each other in any suitable manner within the radial bearing contact interface. As a non-limiting example, the first oblique section may extend from the first vertex toward the side force axial position, the second oblique section may extend from the second vertex toward the side force axial position, and the second vertex may be axially located between the first vertex and the side force axial position. In this configuration of the radial bearing apparatus, the first interface length may be less than, equal to, or greater than the second interface length, and the first bearing interface angle may be smaller than, equal to, or larger than the second bearing interface angle. In this configuration, the first range may potentially accommodate a smaller side force than the second range.

As a particular non-limiting example, the first oblique section length may be greater than the second oblique section length. As a particular non-limiting example, the first bearing interface angle may be smaller than the second bearing interface angle.

One or more of the radial bearing apparatus may be provided as a component of an apparatus. The apparatus may be any suitable apparatus including, as a non-limiting example, an apparatus for use in a borehole. The apparatus for use in a borehole may comprise, consist of, or consist essentially of any apparatus which may be used in a borehole and which may be provided with a radial bearing. As a non-limiting example, the apparatus for use in a borehole may comprise, consist of, or consist essentially of a drilling motor or a rotary steerable drilling apparatus for use in drilling a borehole.

The apparatus may have a length, a proximal end, a distal end, a nominal diameter, and a primary axis. The apparatus may comprise a drill bit. The drill bit may be axially located at or adjacent to the distal end of the apparatus. A nominal diameter of the drill bit may define the gauge of a borehole to be drilled by the drill bit. The nominal diameter of the apparatus may be less than the nominal diameter of the drill bit. The proximal end of the apparatus may be connectable with a drill string. The apparatus may be formed as a single integrated component, or may comprise a plurality of components connected together.

The apparatus may comprise a drilling motor. The drilling motor may comprise a power section, a bearing section, and a transmission section. The transmission section may be axially located between the power section and the bearing section.

A portion of the length of the apparatus may comprise a reduced stiffness section. The reduced stiffness section may flex or bend preferentially relative to other portions of the length of the apparatus in response to a force or a moment which is applied to the apparatus. The reduced stiffness section may be provided in any suitable manner. As non-limiting examples, the reduced stiffness section may be provided as a section of the apparatus which has a relatively lower moment of inertia because of its size and/or shape, as a section of the apparatus which is constructed from a material or combination of materials which has a relatively lower modulus of elasticity, and/or by an articulating joint.

The reduced stiffness section may be at any suitable axial location in the apparatus. As a non-limiting example, the reduced stiffness section may be axially located along the length of the apparatus at a drilling motor. As a particular non-limiting example, the reduced stiffness section may be axially located along the length of the apparatus at the transmission section of a drilling motor.

The apparatus may comprise one of the radial bearing apparatus or any number of a plurality of the radial bearing apparatus. The one or more radial bearing apparatus may be at any suitable axial location in the apparatus. As a non-limiting example, at least one radial bearing apparatus may be axially located along the length of the apparatus between the reduced stiffness section and the distal end of the apparatus.

The apparatus may comprise a shaft. The shaft of the apparatus may be tilted relative to the primary axis in a shaft tilt direction. Alternatively, the shaft of the apparatus may be substantially concentric with and/or substantially parallel to the primary axis of the apparatus.

The apparatus may comprise one or more increased diameter structures in addition to the drill bit which have a larger nominal diameter than the nominal diameter of the apparatus. The one or more increased diameter structures may comprise, consist of, or consist essentially of a stabilizer, a wear pad, a reamer, an anti-rotation device, or any other structure which has a larger nominal diameter than the nominal diameter of the apparatus. As non-limiting examples, the one or more increased diameter structures may be formed integrally with the apparatus, may be provided as a component of the apparatus, and/or may be provided as a sleeve or other suitable attachment to the apparatus. The one or more increased diameter structures may be permanently incorporated into the apparatus or may be removable and/or replaceable. The nominal diameter of the one or more increased diameter structures may be undergauge, gauge, or overgauge relative to the nominal diameter of the drill bit.

The one or more increased diameter structures may be at any suitable axial location in the apparatus. As a non-limiting example, at least one increased diameter structure may be axially located along the length of the apparatus between the reduced stiffness section and the distal end of the apparatus.

The apparatus may comprise one or more bearing assemblies comprising one or more bearings. A bearing assembly may comprise at least one radial bearing apparatus. A bearing assembly may further comprise one or more thrust bearings. A bearing assembly may be at any suitable axial location in the apparatus. As non-limiting examples, a bearing assembly may be included in a bearing section of a drilling motor or may be separate from a bearing section of a drilling motor.

As a non-limiting example, a bearing assembly may be axially located along the length of the apparatus between the reduced stiffness section and the distal end of the apparatus. As a non-limiting example, at least one increased diameter structure may be axially located along the length of the apparatus at one or more of the one or more thrust bearings in a bearing assembly.

The apparatus may comprise a first radial bearing apparatus and a second radial bearing apparatus. The first radial bearing apparatus and the second radial bearing apparatus may be at any suitable axial location in the apparatus. As a non-limiting example, the first radial bearing apparatus and the second radial bearing apparatus may both be axially located in a bearing assembly so that the bearing assembly comprises the first radial bearing apparatus and the second radial bearing apparatus. As a non-limiting example, the bearing assembly may comprise one or more thrust bearings and the one or more thrust bearings may be axially located along the length of the apparatus between the first radial bearing apparatus and the second radial bearing apparatus.

The apparatus may comprise a first increased diameter structure and a second increased diameter structure. The first increased diameter structure and the second increased diameter structure may be at any suitable axial location in the apparatus. As a non-limiting example, the first increased diameter structure may be axially located along the length of the apparatus between the reduced stiffness section and the distal end of the apparatus. As a non-limiting example, the second increased diameter structure may be axially located along the length of the apparatus between the proximal end of the apparatus and the reduced stiffness section. As a non-limiting example, the reduced stiffness section may be axially located along the length of the apparatus between the first increased diameter structure and the second increased diameter structure. As a particular non-limiting example, the second increased diameter structure may be axially located along the length of the apparatus at the power section of a drilling motor.

DETAILED DESCRIPTION

FIGS. 1-11 are exemplary only. The radial bearing apparatus described herein may be used in any suitable apparatus and in any suitable application.

In the description of the exemplary embodiments which follows, features which are identical or generally equivalent in the exemplary embodiments may be identified with the same reference numbers.

Referring to FIG. 1, an exemplary drilling motor (20) comprises a power section (22) and a bearing section (26). The bearing section (26) is axially distal to the power section (22). One or more sections of the drilling motor (20) may be axially located between the power section (22) and the bearing section (26). As depicted in FIG. 1, the drilling motor (20) further comprises a transmission section (24) which is axially located between the power section (22) and the bearing section (26). These sections of the drilling motor (20) constitute components of a powertrain which utilizes fluid energy to rotate a drill bit (28).

A drill string (70) is connected with a proximal end of the power section (22). As depicted in FIG. 1, the drill string (70) includes a drill string communication system (72) such as a measurement-while-drilling system.

The drilling motor (20) comprises a tubular housing (30) for containing components of the sections (22, 24, 26) of the drilling motor (20). The housing (30) may comprise a plurality of housing components which together provide the housing (30), or the housing (30) may be a unitary housing (30) which is formed from a single power housing component.

As depicted in FIG. 1, the housing (30) comprises a plurality of housing sections connected together with threaded connections, including a tubular power housing (32) for the power section (22), a tubular transmission housing (34) for the transmission section (24), and a tubular bearing housing (36) for the bearing section (26).

The power housing (32) may comprise a plurality of power housing components which together provide the power housing (32), or the power housing (32) may be a unitary power housing (32) which is formed from a single power housing component.

The transmission housing (34) may comprise a plurality of transmission housing components which together provide the transmission housing (34), or the transmission housing (34) may be a unitary transmission housing (34) which is formed from a single transmission housing component.

The bearing housing (36) may comprise a plurality of bearing housing components which together provide the bearing housing (36), or the bearing housing (36) may be a unitary bearing housing (36) which is formed from a single bearing housing component.

The power section (22) of the drilling motor (20) comprises a stator (50) and a rotor (52). The stator (50) is fixedly connected with the power housing (32), and the rotor (52) is rotatable within the stator (50) in response to fluid circulating through the power section (22).

As depicted in FIG. 1, the power section (22) is a Moineau-type power section in which the stator (50) and the rotor (52) are lobed. The rotor (52) has one fewer lobe than the stator (50), and rotates eccentrically within the stator (50).

The transmission section (24) accommodates and converts the eccentric movement of the rotor (52) to concentric rotation of a driveshaft (54) within the bearing section (26). The transmission section (24) also transmits rotational drive energy from the power section (22) to the bearing section (26).

As depicted in FIG. 1, the transmission section (24) comprises the transmission housing (34) and a transmission shaft (60) which is connected between the rotor (52) and the driveshaft (54) such that eccentric rotation of the rotor (52) results in concentric rotation of the driveshaft (54). The transmission shaft (60) may be a flexible shaft, the transmission shaft (60) may be interposed between two universal joints, or the eccentric rotation of the rotor (52) may be converted to concentric rotation of the driveshaft (54) via the transmission shaft (60) in some other suitable manner (not shown).

As depicted in FIG. 1, the bearing section (26) comprises the bearing housing (36), the driveshaft (54), and a bearing assembly (not shown in FIG. 1) comprising one or more thrust bearings and one or more radial bearings which rotatably support the driveshaft (54) within the housing (30). One or more radial bearings in the bearing assembly may comprise, consist of, or consist essentially of the radial bearing apparatus described herein.

As depicted in FIG. 1, the bearing section (26) also comprises a stabilizer (62) which is attached to or integral with the exterior of the bearing housing (36). The stabilizer (62) has a larger nominal diameter than the nominal diameter of the drilling motor (20). As a result, the stabilizer (62) may be considered to be an increased diameter structure as described herein.

As depicted in FIG. 1, the drill bit (28) is connected with the driveshaft (54) so that rotation of the driveshaft (54) causes rotation of the drill bit (28).

The drilling motor (20) has a primary axis (80) and the driveshaft (54) has a driveshaft axis (82). As depicted in FIG. 1, the driveshaft axis (82) is oblique to the primary axis (80) so that the driveshaft (54) is tilted relative to the primary axis (80) in a shaft tilt direction (84). The tilt of the driveshaft (54) may be provided by a bend in the exterior of the housing (30), by a bend in the interior of the housing (30), by an articulation of the driveshaft (54) within the housing (30), or in any other suitable manner. The tilt of the driveshaft (54) may be fixed (i.e., non-adjustable) or may be adjustable.

Referring to FIG. 2, an exemplary rotary steerable drilling apparatus (90) comprises a housing (92) having an exterior surface (94). A shaft (96) extends through the housing (92). The shaft (96) is rotatable relative to the housing (92).

In the exemplary rotary steerable drilling apparatus (90), a drill bit (98) is connected with a distal end of the shaft (96), and a drill string (100) is connected with a proximal end of the shaft (96). As depicted in FIG. 2, the drill string (100) includes a drill string communication system (102) such as a measurement-while-drilling system.

In the exemplary rotary steerable drilling apparatus (90), an anti-rotation device (104) is connected with or integrated into the housing (92) adjacent to a proximal end of the housing (92), and a near-bit stabilizer (106) is connected with or integrated into the housing (92) adjacent to a distal end of the housing (92). The anti-rotation device (104) and the near-bit stabilizer (106) each have a nominal diameter which is larger than the nominal diameter of the rotary steerable drilling apparatus (90). As a result, the anti-rotation device (104) and the near-bit stabilizer (106) may be considered to be increased diameter structures as described herein.

In the exemplary rotary steerable drilling apparatus (90), a deflection mechanism (108) is contained within the housing (92), which may be actuated to cause radial deflection of a portion of the shaft (96) within the housing (92).

The deflection mechanism (108) may be comprised of any structure, device, or apparatus which is capable of causing the radial deflection of the portion of the shaft (96) within the housing (92). The radial deflection of the portion of the shaft (96) may result in bending of the shaft (96) within the housing (92). Additionally or alternatively, the radial deflection of the portion of the shaft (96) may result in articulation of the shaft (96) within the housing (92), if the shaft (96) is comprised of a joint (not shown) which facilitates such articulation. In either case, the radial deflection of the shaft (96) may cause the shaft (96) to tilt relative to the housing (92) in a shaft tilt direction (110).

In the exemplary embodiment of the rotary steerable drilling apparatus (90), a bearing assembly (not shown in FIG. 2) is contained within the housing (92), comprising one or more thrust bearings and one or more radial bearings which rotatably support the shaft (96) within the housing (92). One or more radial bearings in the bearing assembly may comprise, consist of, or consist essentially of the radial bearing apparatus described herein.

Referring to FIGS. 3-5 and 7-9, exemplary embodiments of a radial bearing apparatus (120) are depicted. The exemplary embodiments of the radial bearing apparatus (120) may be configured and/or adapted as a component of an apparatus such as, without limitation, an apparatus (122) for use in a borehole, including as non-limiting examples the drilling motor (20) depicted in FIG. 1 and/or the rotary steerable drilling apparatus (90) depicted in FIG. 2.

Figure 4:
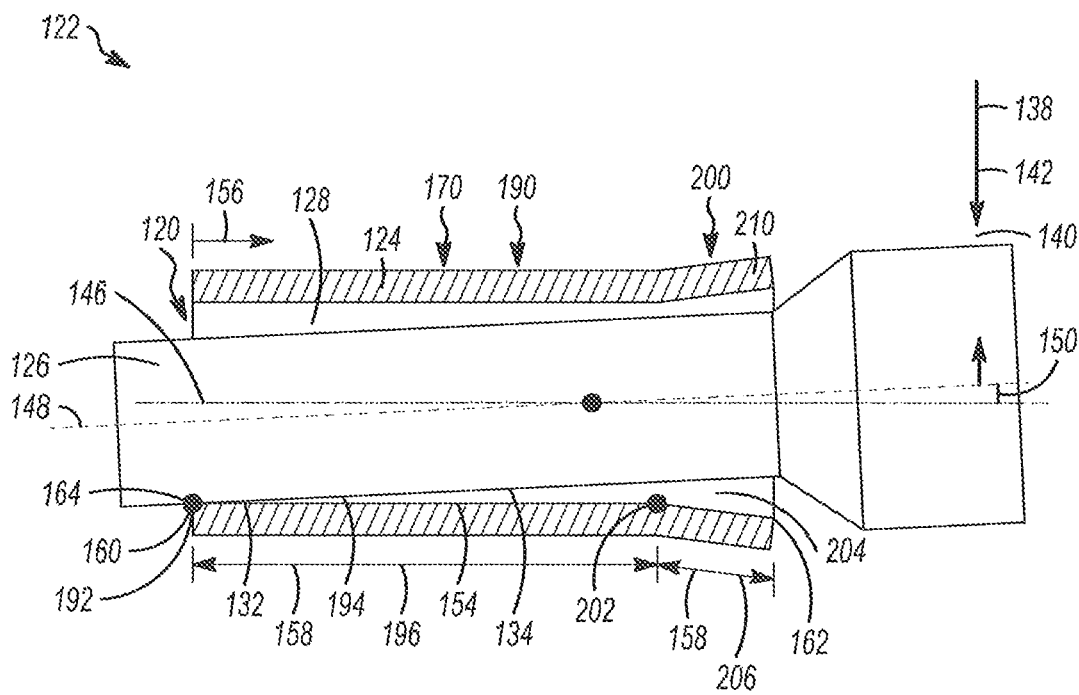
FIG. 4 is a schematic side view of a second exemplary embodiment of an apparatus including a radial bearing apparatus, wherein a first oblique section of the radial bearing contact interface is provided by a relative tilt between the radial bearing housing surface and the radial bearing shaft surface, and wherein a second oblique section of the radial bearing contact interface is provided by the relative tilt between the radial bearing housing surface and the radial bearing shaft surface and by a flare at the distal end of the radial bearing housing surface.
Figure 7:
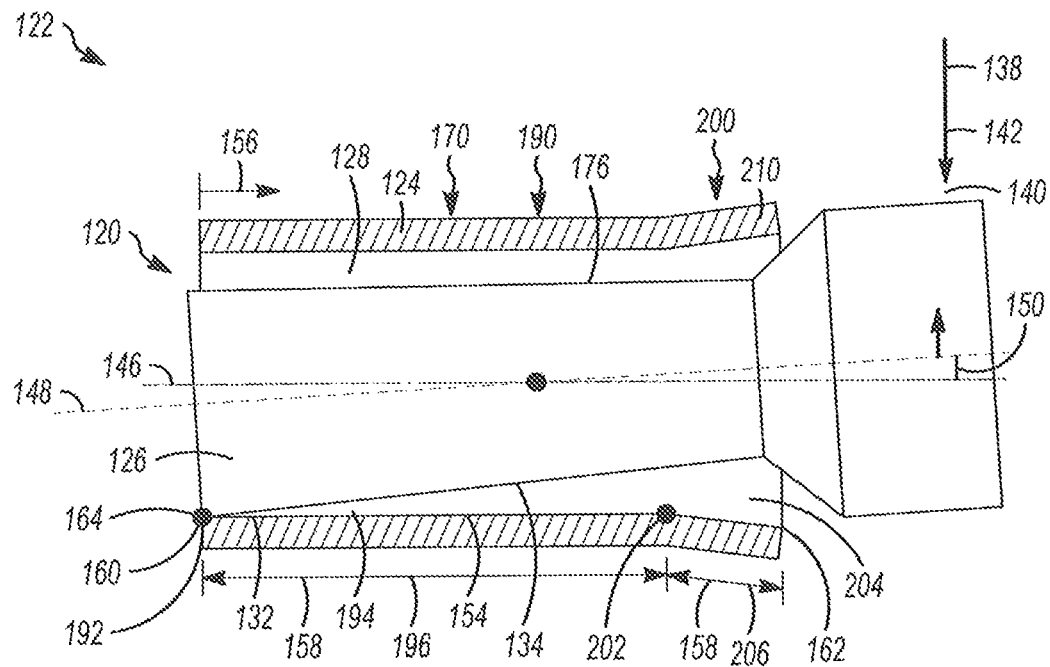
FIG. 7 is a schematic side view of a third exemplary embodiment of an apparatus including a radial bearing apparatus, wherein a first oblique section of the radial bearing contact interface is provided by a relative tilt between the radial bearing housing surface and the radial bearing shaft surface and by a taper of the radial bearing shaft surface, and wherein a second oblique section of the radial bearing contact interface is provided by the relative tilt between the radial bearing housing surface and the radial bearing shaft surface, by the taper of the radial bearing shaft surface, and by a flare at the distal end of the radial bearing housing surface.
Figure 8:
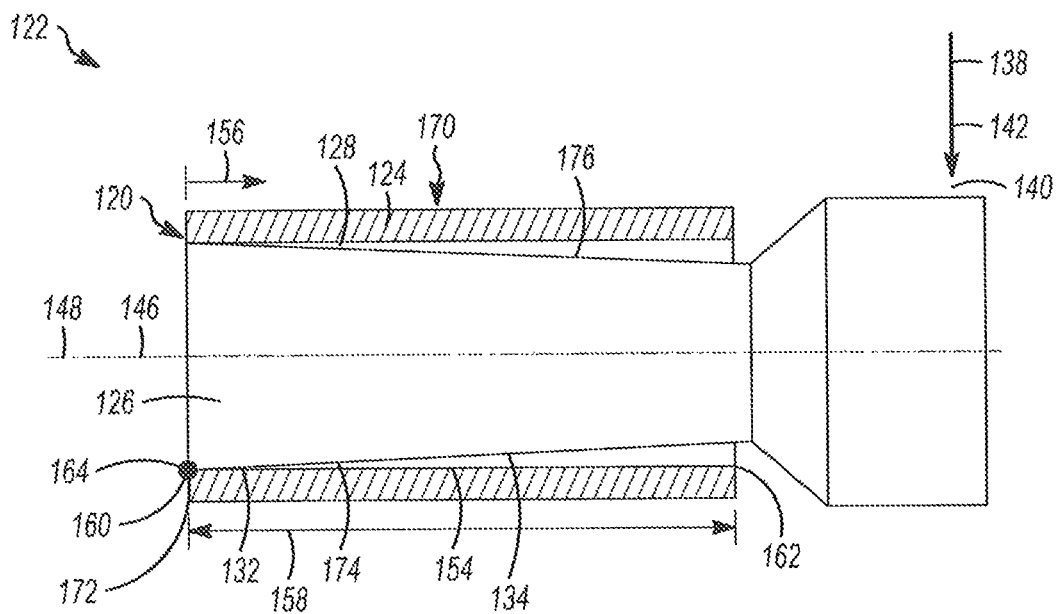
FIG. 8 is a schematic side view of a fourth exemplary embodiment of an apparatus including a radial bearing apparatus, wherein a single oblique section of the radial bearing contact interface is provided by a taper of the radial bearing shaft surface.
Figure 9:
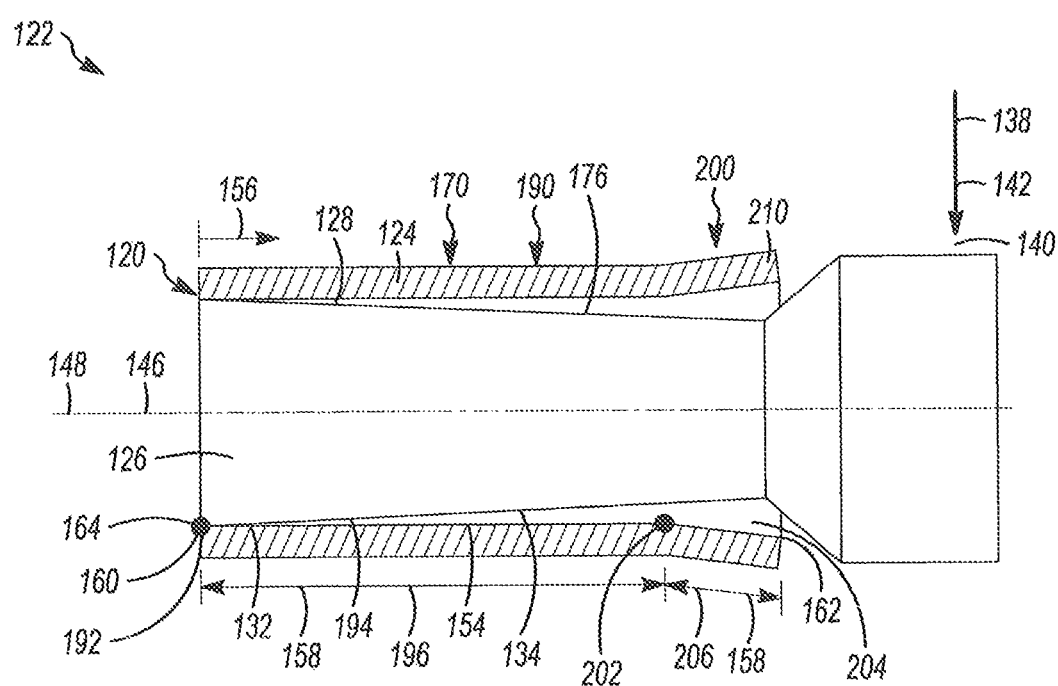
FIG. 9 is a schematic side view of a fifth exemplary embodiment of an apparatus including a radial bearing apparatus, wherein a first oblique section of the radial bearing contact interface is provided by a taper of the radial bearing shaft surface, and wherein a second oblique section of the radial bearing contact interface is provided by the taper of the radial bearing shaft surface and by a flare at the distal end of the radial bearing housing surface.

FIG. 3 depicts a first exemplary embodiment of the radial bearing apparatus (120). FIG. 4 depicts a second exemplary embodiment of the radial bearing apparatus (120). FIG. 7 depicts a third exemplary embodiment of the radial bearing apparatus (120). FIG. 8 depicts a fourth exemplary embodiment of the radial bearing apparatus (120). FIG. 9 depicts a fifth exemplary embodiment of the radial bearing apparatus (120).

In the description that follows, features which are common to some or all of the exemplary embodiments are first described, followed by descriptions of other features of the particular exemplary embodiments. In the description that follows, features which are common to some or all of the exemplary embodiments may be indicated by the same reference numbers.

In the exemplary embodiments, the radial bearing apparatus (120) comprises a housing (124) and a shaft (126). In the exemplary embodiments, the housing (124) may be a component or section of the housing (30) of a drilling motor (20), the housing (124) may be a component or section of the housing (92) of a rotary steerable drilling apparatus (90), or the housing (124) may be connected with the housing (30) of a drilling motor (20) or with the housing (92) of a rotary steerable drilling apparatus (90). In the exemplary embodiments, the shaft (126) may be a driveshaft (54) of a drilling motor (20) or may be connected with a driveshaft (54) of a drilling motor (20), or the shaft (126) may be a shaft (96) of a rotary steerable drilling apparatus (100) or may be connected with a shaft (96) of a rotary steerable drilling apparatus (100).

In the exemplary embodiments, the housing (124) defines a housing bore (128) and comprises a radial bearing housing surface (132) within the housing bore (128). The shaft (126) extends through the housing bore (128) and comprises a radial bearing shaft surface (134) on an exterior of the shaft (126). In the exemplary embodiments, the radial bearing housing surface (132) and the radial bearing shaft surface (134) both comprise plain bearing surfaces which are provided as sleeves or as a coating on the housing bore (128) and the exterior of the shaft (126) respectively.

FIGS. 3-5 and 7-9 each depict a side force (138) which has been applied to the shaft (126) at a side force axial position (140) and in a side force direction (142). The side force (138), the side force axial position (140), and/or the side force direction (142) may be constant or may vary for a particular apparatus (122), depending upon such non-limiting factors as the configuration of the apparatus (122), the mode of use of the apparatus (122), and the environment surrounding the apparatus (122) during use.

The side force (138) may tend to move the shaft (126) transversely within the housing bore (128) in the side force direction (142).

The apparatus (122) has a primary axis (146). In the exemplary embodiments, the primary axis (146) of the apparatus (122) is the "principal" or "main" axis of the apparatus (122), which may be the axis of the apparatus (122) at or adjacent to the proximal end of the apparatus (122).

The shaft (126) of the apparatus (122) has a shaft axis (148). The shaft axis (148) of the apparatus (122) may be substantially parallel to the primary axis (146) of the apparatus (122). Alternatively, the shaft axis (148) of the apparatus (122) may be oblique to the primary axis (146) of the apparatus (122).

If the apparatus (122) is a straight drilling motor (20) or if the apparatus (122) is a rotary steerable drilling apparatus (100) in which the deflection mechanism is not actuated, the shaft axis (148) of the apparatus (122) may be substantially parallel to the primary axis (146) of the apparatus (122).

If the shaft axis (148) of the apparatus (122) is substantially parallel to the primary axis (146) of the apparatus (122), the side force direction (142) may be dependent upon the orientation and positioning of the apparatus (122) in the borehole environment (not shown in FIGS. 3-5 and 7-9) surrounding the apparatus (122). As a result, the side force direction (142) relative to the housing (124) and the housing bore (128) of the radial bearing apparatus (120) may vary as the orientation of the apparatus (122) in the surrounding borehole environment changes.

If the apparatus (122) is a bent drilling motor (20) or if the apparatus (122) is a rotary steerable drilling apparatus (100) in which the deflection mechanism is actuated, the shaft axis (148) of the apparatus (122) may be oblique to the primary axis (146) of the apparatus (122) so that the shaft (126) is tilted relative to the primary axis (146) in a shaft tilt direction (150).

If the shaft (126) is tilted relative to the primary axis (146) in the shaft tilt direction (150), a side force (138) may be exerted against the tilt of the shaft (126) by the borehole environment (not shown in FIGS. 3-5 and 7-9) surrounding the apparatus (122) such that the shaft tilt direction (150) is opposite to the side force direction (142). As a result, the side force direction (142) may be fixed or constant relative to the housing (124) and the housing bore (128) of the radial bearing apparatus (120).

A radial bearing contact interface (154) is provided between the radial bearing housing surface (132) and the radial bearing shaft surface (134) for bearing the side force (138) which is applied to the shaft (126) in the side force direction (142). Since the side force (138) will tend to move the shaft (126) transversely in the housing bore (128) in the side force direction (142), the radial bearing contact interface (154) will typically be on an opposite side of the shaft (126) (i.e., 180 degrees around the circumference of the shaft (126)) from the location of application of the side force (138), assuming that the side force (138) is a pushing force.

If the side force direction (142) is expected to be fixed or constant relative to the housing bore (128), then the circumferential location of the radial bearing contact interface (154) may potentially also be fixed or constant relative to the housing bore (128), with the result that the radial bearing housing surface (132) may potentially be required to be provided around only a portion of the circumference of the housing bore (128). In such circumstances, the radial bearing contact interface (154) may be configured to be circumferentially asymmetrical within the housing bore (128).

If the side force direction (142) is expected to vary relative to the housing bore (128), then the circumferential location of the radial bearing contact interface (154) may potentially also vary around the circumference of the housing bore (128), with the result that the radial bearing housing surface (132) may potentially be required to be provided around the entire circumference of the housing bore (128). In such circumstances, the radial bearing contact interface may be configured to be circumferentially symmetrical within the housing bore (128).

Referring to FIGS. 3-5 and 7-9, in the exemplary embodiments, the radial bearing contact interface (154) extends in an axial direction (156) for an interface length (158) within the housing bore (128) between a first interface end (160) and a second interface end (162). The interface length (158) is the maximum length of contact between the radial bearing housing surface (132) and the radial bearing shaft surface (134).

In the exemplary embodiments, the radial bearing contact interface (154) also extends circumferentially for an interface width (not shown) within the housing bore (128). The interface width is the maximum width of contact between the radial bearing housing surface (132) and the radial bearing shaft surface (134), and is defined by the shape, dimensions, and configuration of the radial bearing surfaces (132, 134). In the exemplary embodiments, the housing bore (128) and the shaft (126) are both cylindrical so that the radial bearing surfaces (132, 134) are cylindrically shaped and the interface width is a circumferential arc of contact between the radial bearing surfaces (132, 134).

The radial bearing contact interface (154) facilitates a contact area (164) between the radial bearing surfaces (132, 134). The interface length (158) multiplied by the interface width represents a maximum contact area between the radial bearing housing surface (132) and the radial bearing shaft surface (134) when the radial bearing housing surface (132) and the radial bearing shaft surface (134) are in contact with each other along the entire interface length (158) and the entire interface width.

The radial bearing contact interface (154) may comprise, consist of, or consist essentially of a single or unitary interface section between the radial bearing housing surface (132) and the radial bearing shaft surface (134), or the radial bearing contact interface (154) may comprise a plurality of interface sections between the radial bearing housing surface (132) and the radial bearing shaft surface (134). An interface section may be an oblique section or may be a non-oblique section.

In the exemplary embodiments, the radial bearing contact interface (154) comprises at least one oblique section (170) along which the radial bearing housing surface (132) and the radial bearing shaft surface (134) are arranged to be oblique to each other in the axial direction (156) when the side force (138) is zero. The radial bearing housing surface (132) and the radial bearing shaft surface (134) are arranged to become generally less oblique to each other within a range along the oblique section (170) as the side force (138) increases from zero.

In the exemplary embodiments, the oblique section (170) has a vertex (172) which is defined by an axial location of maximum convergence of the radial bearing housing surface (132) and the radial bearing shaft surface (134) along the oblique section (170). In the exemplary embodiments, the gap between the radial bearing housing surface (132) and the radial bearing shaft surface (134) at the vertex (172) may be zero, minimal, or substantial, depending upon the configuration of the oblique section (170). In the exemplary embodiments, the oblique section (170) extends from the vertex (172) toward the side force axial position (140).

A bearing interface angle (174) is defined between the radial bearing housing surface (132) and the radial bearing shaft surface (134) at the vertex (172) of the oblique section (170). The bearing interface angle (174) is generally larger than zero when the side force (138) is zero. The bearing interface angle (174) may tend generally to decrease within an angular range as the side force increases from zero.

Consequently, in the exemplary embodiments, as the side force (138) increases from zero, the radial bearing housing surface (132) and the radial bearing shaft surface (134) may become generally less oblique to each other within a range and the bearing interface angle (174) may tend generally to decrease within an angular range. As the radial bearing housing surface (132) and the radial bearing shaft surface (134) become generally less oblique to each other and/or as the bearing interface angle (174) decreases, the contact area between the radial bearing surfaces (132, 134) may increase, may be maintained, or may be shifted within the radial bearing contact interface (154).

In the first exemplary embodiment of the radial bearing apparatus (120) depicted in FIG. 3 and the fourth exemplary embodiment of the radial bearing apparatus (120) depicted in FIG. 8, the radial bearing contact interface (154) comprises a single oblique section (170) having a vertex (172) and a bearing interface angle (174).

Referring to FIG. 3, in the first exemplary embodiment, the single oblique section (170) of the radial bearing contact interface (154) is provided by a relative tilt between the radial bearing housing surface (132) and the radial bearing shaft surface (134). In the first exemplary embodiment, the relative tilt of the bearing surfaces (132, 134) is achieved by configuring the housing (124) and the shaft (126) so that the bearing surfaces (132, 134) are oblique relative to each other. In the first exemplary embodiment, the radial bearing surfaces (132, 134) along the oblique section (170) are substantially straight surfaces. In the first exemplary embodiment, the shaft axis (148) of the apparatus (122) is oblique to the primary axis (146) of the apparatus (122) so that the shaft (126) is tilted relative to the primary axis (146) in a shaft tilt direction (150).

In FIG. 3, the radial bearing apparatus (120) is depicted in an exaggerated manner with a relatively large side force (138) applied to the shaft (126) so that the shaft (126) has pivoted, tilted, or bent around the vertex (172) of the oblique section (170), with the result that the radial bearing housing surface (132) and the radial bearing shaft surface (134) have become less oblique to each other and the bearing interface angle has decreased to the extent that the radial bearing surfaces (132, 134) are substantially parallel to each other along the oblique section (170).

Referring to FIG. 8, in the fourth exemplary embodiment, the single oblique section (170) of the radial bearing contact interface (154) is provided by a taper (176) of the radial bearing shaft surface (134). In the fourth exemplary embodiment, the radial bearing surfaces (132, 134) along the oblique section (170) are substantially straight surfaces. In the fourth exemplary embodiment, the shaft axis (148) of the apparatus (122) is substantially concentric with and/or substantially parallel to the primary axis (146) of the apparatus (122).

In FIG. 8, the radial bearing apparatus (120) is depicted with a relatively small side force (138) applied to the shaft (126) so that the bearing surfaces (132, 134) continue to be significantly oblique to each other along the oblique section (170) and so that the bearing interface angle (174) remains relatively large.

In the second exemplary embodiment of the radial bearing apparatus (120) depicted in FIG. 4, the third exemplary embodiment of the radial bearing apparatus (120) depicted in FIG. 7, and the fifth exemplary embodiment of the radial bearing apparatus (120) depicted in FIG. 9, the oblique section (170) is a first oblique section (190) and the radial bearing contact interface (154) further comprises a second oblique section (200). The first oblique section (190) has a first vertex (192), a first bearing interface angle (194) and a first oblique section length (196). The second oblique section (200) has a second vertex (202), a second bearing interface angle (204), and a second oblique section length (206).

In the second exemplary embodiment, the third exemplary embodiment, and the fifth exemplary embodiment, the radial bearing housing surface (132) and the radial bearing shaft surface (134) are arranged to be generally oblique to each other in the axial direction along each of the first oblique section (190) and the second oblique section (200) when the side force (138) is zero.

In the second exemplary embodiment, the third exemplary embodiment, and the fifth exemplary embodiment, the radial bearing housing surface (132) and the radial bearing shaft surface (134) are arranged to become generally less oblique within a first range along the first oblique section (190) as the side force (138) increases from zero, and the radial bearing housing surface (132) and the radial bearing shaft surface (134) are arranged to become generally less oblique within a second range along the second oblique section (200) as the side force (138) increases from zero.

In the second exemplary embodiment, the third exemplary embodiment, and the fifth exemplary embodiment, the first bearing interface angle (194) may decrease within a first angular range as the side force (138) increases from zero, and the second bearing interface angle may decrease within a second angular range when the side force (138) increases from zero.

In the second exemplary embodiment, the third exemplary embodiment, and the fifth exemplary embodiment, the first oblique section (190) extends from the first vertex (192) toward the side force axial position (140), the second oblique section (200) extends from the second vertex (202) toward the side force axial position, the second vertex (202) is between the first vertex (192) and the side force axial position (140), the first bearing interface angle (194) is smaller than the second bearing interface angle (204), and the first oblique section length (196) is greater than the second oblique section length (206).

Referring to FIG. 4, in the second exemplary embodiment, the first oblique section (190) of the radial bearing contact interface (154) is provided by a relative tilt between the radial bearing housing surface (132) and the radial bearing shaft surface (134), and the second oblique section (200) of the radial bearing contact interface (154) is provided by the relative tilt between the radial bearing housing surface (132) and the radial bearing shaft surface (134) and by a flare (210) at the distal end of the radial bearing housing surface (132). The relative tilt of the bearing surfaces (132, 134) may be achieved by arranging one or both of the bearing surfaces (132, 134) to be tilted relative to the other bearing surface (132, 134) when the side force (138) is zero. In the second exemplary embodiment, the radial bearing surfaces (132, 134) along both the first oblique section (190) and the second oblique section (200) are substantially straight surfaces. In the second exemplary embodiment, the shaft axis (148) of the apparatus (122) is oblique to the primary axis (146) of the apparatus (122) so that the shaft (126) is tilted relative to the primary axis (146) in a shaft tilt direction (150).

In FIG. 4, the radial bearing apparatus (120) is depicted with a relatively small side force (138) applied to the shaft (126) so that the bearing surfaces (132, 134) continue to be significantly oblique to each other along both the first oblique section (190) and the second oblique section (200) and so that the first bearing interface angle (194) and the second bearing interface angle (204) remain relatively large.

Referring to FIG. 7, in the third exemplary embodiment, the first oblique section (190) of the radial bearing contact interface (154) is provided by a relative tilt between the radial bearing housing surface (132) and the radial bearing shaft surface (134) and by a taper (176) of the radial bearing shaft surface (134), and the second oblique section (200) of the radial bearing contact interface (154) is provided by the relative tilt between the radial bearing housing surface (132) and the radial bearing shaft surface (134), by the taper (176) of the radial bearing shaft surface (134), and by a flare (210) at the distal end of the radial bearing housing surface (132). The relative tilt of the bearing surfaces (132, 134) may be achieved by arranging one or both of the bearing surfaces (132, 134) to be tilted relative to the other bearing surface (132, 134) when the side force (138) is zero. In the third exemplary embodiment, the radial bearing surfaces (132, 134) along both the first oblique section (190) and the second oblique section (200) are substantially straight surfaces. In the third exemplary embodiment, the shaft axis (148) of the apparatus (122) is oblique to the primary axis (146) of the apparatus (122) so that the shaft (126) is tilted relative to the primary axis (146) in a shaft tilt direction (150).

In FIG. 7, the radial bearing apparatus (120) is depicted with a relatively small side force (138) applied to the shaft (126) so that the bearing surfaces (132, 134) continue to be significantly oblique to each other along both the first oblique section (190) and the second oblique section (200) and so that the first bearing interface angle (194) and the second bearing interface angle (204) remain relatively large.

Referring to FIG. 9, in the fifth exemplary embodiment, the first oblique section (190) of the radial bearing contact interface (154) is provided by a taper (176) of the radial bearing shaft surface (134), and the second oblique section (200) of the radial bearing contact interface (154) is provided by the taper (176) of the radial bearing shaft surface (134) and by a flare (210) at the distal end of the radial bearing housing surface (132). The relative tilt of the bearing surfaces (132, 134) may be achieved by arranging one or both of the bearing surfaces (132, 134) to be tilted relative to the other bearing surface (132, 134) when the side force (138) is zero. In the fifth exemplary embodiment, the radial bearing surfaces (132, 134) along both the first oblique section (190) and the second oblique section (200) are substantially straight surfaces. In the fifth exemplary embodiment, the shaft axis (148) of the apparatus (122) is substantially concentric with and/or substantially parallel to the primary axis (146) of the apparatus (122).

In FIG. 9, the radial bearing apparatus (120) is depicted with a relatively small side force (138) applied to the shaft (126) so that the bearing surfaces (132, 134) continue to be significantly oblique to each other along both the first oblique section (190) and the second oblique section (200) and so that the first bearing interface angle (194) and the second bearing interface angle (204) remain relatively large.

Figure 5A:
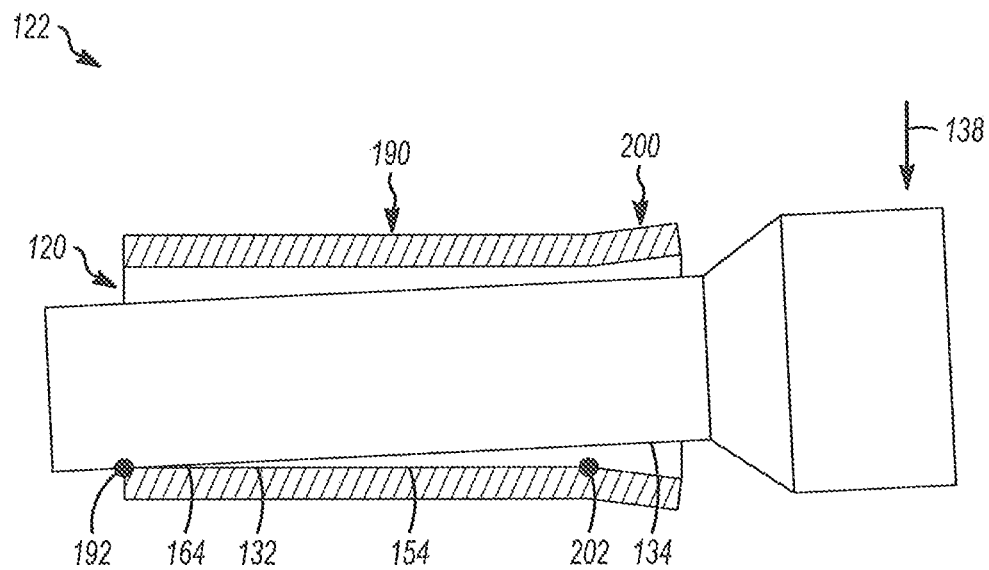
FIGS. 5A-5C provide views schematically depicting modeling of the second exemplary embodiment of the radial bearing apparatus as a component of a drilling motor during a sliding mode of operation, a rotary mode of operation, and a mode in which the shaft experiences a reverse-bend respectively, wherein the deflection profiles of the shaft are exaggerated for illustration purposes.
Figure 5B:
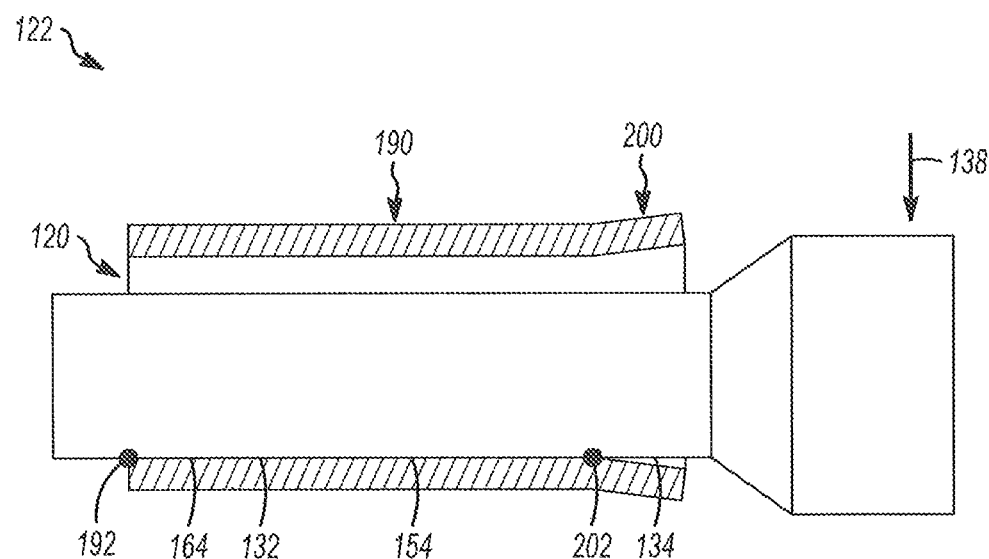
Figure 5C:
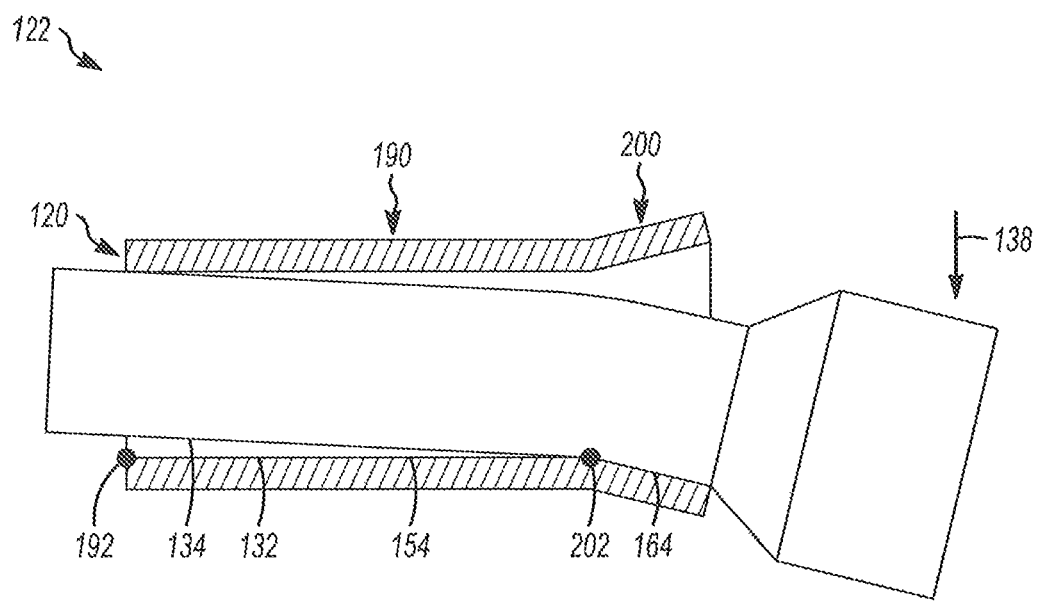

FIGS. 5A-5C schematically depict modeling of the second exemplary embodiment of the radial bearing apparatus (120) in different modes of operation of the apparatus (122), wherein the apparatus (122) is a drilling motor (20).

FIG. 5A depicts the second exemplary embodiment of the radial bearing apparatus (120) during a sliding mode of operation of the drilling motor (20). Sliding mode occurs when the housing (30) of the drilling motor (20) is not rotated relative to the borehole, but the driveshaft (54) of the drilling motor (20) is rotated by the power section (22) of the drilling motor (20). Sliding mode may be predicted to apply a low to moderate side force (138) to the drilling motor (20)

and the radial bearing apparatus (120). In sliding mode, the contact between the radial bearing housing surface (132) and the radial bearing shaft surface (134) may be expected to be predominantly toward the first vertex (192) of the first oblique section (190).

FIG. 5B depicts the second exemplary embodiment of the radial bearing apparatus (120) during a rotary mode of operation of the drilling motor (20). Rotary mode occurs when the housing (30) of the drilling motor (20) is rotated relative to the borehole and the driveshaft (54) is or may be simultaneously rotated by the power section (22) of the drilling motor (20). Rotary mode may be predicted to apply a moderate to high side force (138) to the drilling motor (20) and the radial bearing apparatus (120). In rotary mode, the contact between the radial bearing housing surface (132) and the radial bearing shaft surface (134) may be expected to be along a significant portion of the first oblique section (190).

FIG. 5C depicts the second exemplary embodiment of the radial bearing apparatus (120) during a mode of operation of the drilling motor (20) in which the driveshaft (54) of the drilling motor (20) experiences a reverse-bend. A reverse-bend occurs when a side force (138) is applied to the drilling motor (20) and the radial bearing apparatus (120) is sufficiently large to cause the driveshaft (54) of the drilling motor (20) to bend in a direction opposite to the shaft tilt direction (84). During reverse-bend mode, the contact between the radial bearing housing surface (132) and the radial bearing shaft surface (134) may be expected to be along the distal end of the first oblique section (190) and/or along all or a portion of the second oblique section (200).

Figure 6:
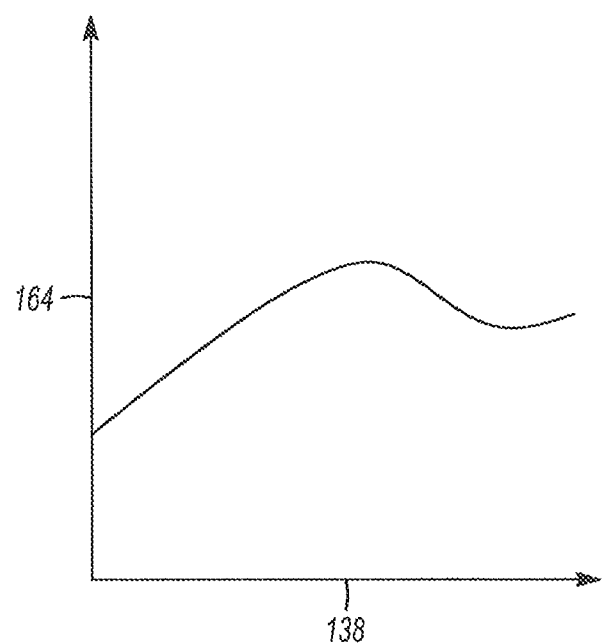
FIG. 6 is a graph depicting a modeled relationship of side force to bearing surface contact area for the second exemplary embodiment of the radial bearing apparatus as a component of a drilling motor during the modes of operation depicted in FIGS. 5A-5C.

FIG. 6 is a graph depicting a modeled relationship of side force (138) to bearing surface contact area for the second exemplary embodiment of the radial bearing apparatus (120) as a component of a drilling motor (20) during the modes of operation depicted in FIGS. 5A-5C.

The modeled relationship depicted in FIG. 6 suggests that the contact area between the radial bearing surfaces (132, 134) may tend generally to increase within a range or to be maintained as the side force (138) increases during either the sliding mode or rotary mode of operation, may tend to decrease within a range or to be maintained during a transition to reverse-bend mode, and may tend generally to increase within a range as the side force (138) increases during the reverse-bend mode.

A variation in contact area and location of contact between the radial bearing surfaces (132, 134) as modeled in FIGS. 5A-5C and FIG. 6 may assist in distributing loads along the radial bearing contact interface (154), which may in turn assist in reducing wear and/or failure of the radial bearing apparatus (120). A variation in contact area and location of contact between the radial bearing surfaces (132, 134) as modeled in FIGS. 5A-5C and FIG. 6 may also potentially assist in reducing wear at the proximal end of the radial bearing contact interface (154), which may prevent or delay a reduction in the driveshaft tilt angle which may result from wear of the radial bearing surfaces (132, 134).

Figure 10:
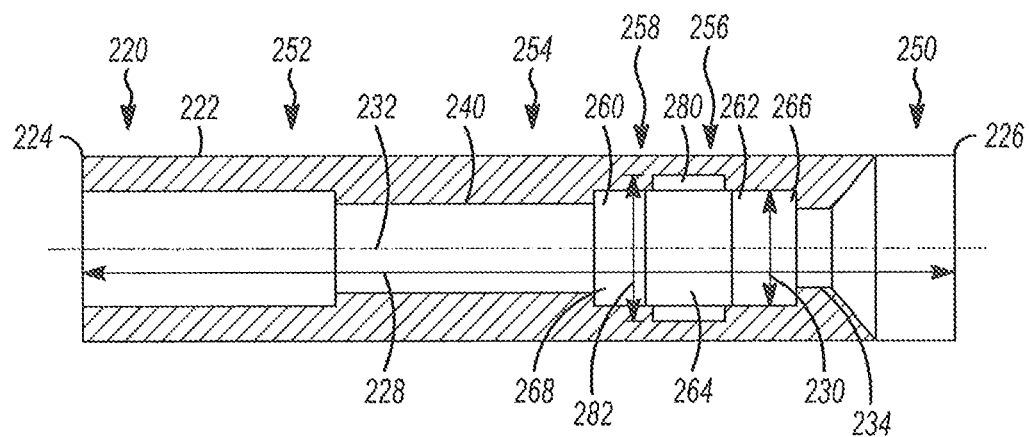
FIG. 10 is a schematic longitudinal section view of a second exemplary embodiment of an apparatus for use in drilling a borehole, wherein the apparatus comprises a reduced stiffness section located along the length of the apparatus between a power section and a bearing assembly, an increased diameter structure located between the reduced stiffness section and a distal end of the apparatus, and at least one radial bearing apparatus as a component of the apparatus.
Figure 11:
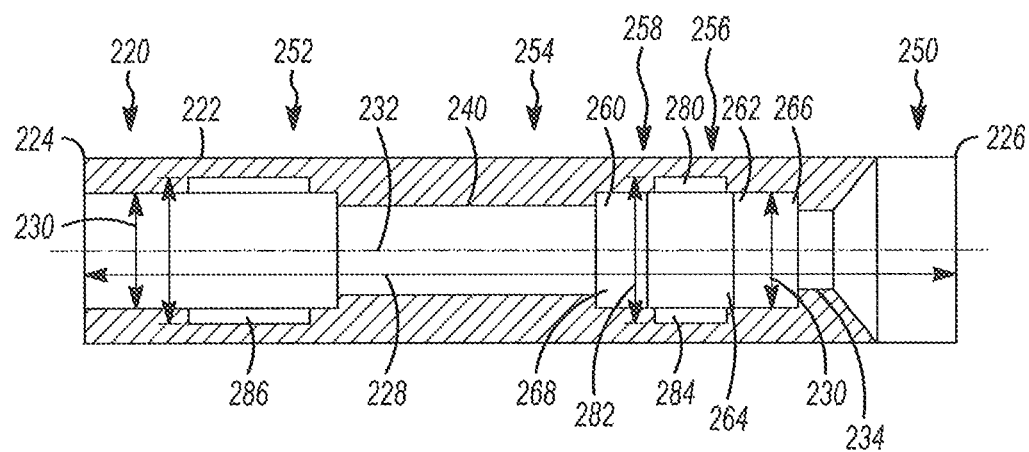
FIG. 11 is a schematic longitudinal section view of a first exemplary embodiment of an apparatus for use in drilling a borehole, wherein the apparatus comprises a reduced stiffness section located along the length of the apparatus between a power section and a bearing assembly, a first increased diameter structure located between the reduced stiffness section and a distal end of the apparatus, a second increased diameter structure located between a proximal end of the apparatus and the reduced stiffness section, and at least one radial bearing apparatus as a component of the apparatus.

FIG. 10 schematically depicts a first exemplary embodiment of an apparatus (220) for use in drilling a borehole (222). FIG. 11 schematically depicts a second exemplary embodiment of an apparatus (220) for use in drilling a borehole (222).

In the exemplary embodiments, the apparatus (220) has a proximal end (224), a distal end (226), a length (228), a nominal diameter (230), and a primary axis (232). The distal end (226) of the apparatus (220) comprises a drill bit (not shown in FIGS. 10-11). The proximal end (224) of the apparatus (220) is connectable with a drill string (not shown in FIGS. 10-11).

In the exemplary embodiments, the apparatus (220) comprises a shaft (234). The shaft (234) of the apparatus (220) may be tilted relative to the primary axis (232) of the apparatus (220) in a shaft tilt direction (not shown). Alternatively, the shaft (234) of the apparatus (220) may be substantially concentric with and/or substantially parallel to the primary axis (232) of the apparatus (220).

In the exemplary embodiments, a portion of the length (228) of the apparatus (220) comprises a reduced stiffness section (240). The reduced stiffness section (240) flexes or bends preferentially relative to other portions of the length (228) of the apparatus (220) in response to a force or moment which is applied to the apparatus (228). In the exemplary embodiments, the reduced stiffness section (240) is provided as a reduced diameter section of the apparatus (220).

In the exemplary embodiments, the apparatus (220) comprises a drilling motor (250). The drilling motor (250) comprises a power section (252), a transmission section (254), and a bearing section (256). In the exemplary embodiments, the transmission section (254) is axially located along the length (228) of the apparatus (220) between the power section (252) and the bearing section (256). In the exemplary embodiments, the reduced stiffness section (240) is axially located along the length (228) of the apparatus (220) at the drilling motor (250). In the exemplary embodiments, the reduced stiffness section (240) is more particularly axially located along the length (228) of the apparatus (220) at the transmission section (254) of the drilling motor (250).

The bearing section (256) of the drilling motor (250) comprises a bearing assembly (258). In the exemplary embodiments, the bearing assembly (258) comprises a proximal radial bearing (260), a distal radial bearing (262), and one or more thrust bearings (264). In the exemplary embodiments, the bearing section (256) and the bearing assembly (258) of the drilling motor (250) are axially located along the length (228) of the apparatus (220) between the reduced stiffness section (240) and the distal end (226) of the apparatus (220).

At least one of the proximal radial bearing (260) and the distal radial bearing (262) may comprise a radial bearing apparatus (120) as previously described. In the exemplary embodiments, at least the distal radial bearing (262) comprises a radial bearing apparatus (120) as previously described. As depicted in FIGS. 10 and 11, the distal radial bearing (262) is a first radial bearing apparatus (266) and the proximal radial bearing (260) is a second radial bearing apparatus (268), so that both the proximal radial bearing (260) and the distal radial bearing (262) comprise a radial bearing apparatus (120) as previously described. In the exemplary embodiments, the one or more thrust bearings (264) in the bearing assembly (258) are axially located along the length (228) of the apparatus (220) between the first radial bearing apparatus (266) and the second radial bearing apparatus (268).

In the exemplary embodiments, the apparatus (220) comprises an increased diameter structure (280), which has a larger nominal diameter (282) than the nominal diameter (230) of the apparatus (220).

In the first exemplary embodiment, the increased diameter structure (280) is a stabilizer. In the first exemplary embodiment, the increased diameter structure (280) is axially located along the length (228) of the apparatus (220)

between the reduced stiffness section (240) and the distal end (226) of the apparatus (220).

In the second exemplary embodiment, the increased diameter structure (280) is a first increased diameter structure (284) and the apparatus (220) further comprises a second increased diameter structure (286). In the second exemplary embodiment, both the first increased diameter structure (284) and the second increased diameter structure (286) are stabilizers. In the second exemplary embodiment, the first increased diameter structure (284) is axially located along the length (228) of the apparatus (220) between the reduced stiffness section (240) and the distal end (226) of the apparatus (220). In the second exemplary embodiment, the second increased diameter structure (286) is axially located along the length (228) of the apparatus (220) between the proximal end (224) of the apparatus (220) and the reduced stiffness section (240). In the second exemplary embodiment, the reduced stiffness section (240) is axially located along the length (228) of the apparatus (220) between the first increased diameter structure (284) and the second increased diameter structure (286). In the second exemplary embodiment, the second increased diameter structure (286) is more particularly axially located along the length (228) of the apparatus (220) at the power section (252) of the drilling motor (250).

The combination of the apparatus (220) comprising the reduced stiffness section (240), at least one increased diameter structure (280, 284, 286), and at least one radial bearing apparatus (120) may assist in reducing, controlling and/or managing stresses exerted on the apparatus (220), and may result in a longer service life of the apparatus (220). The reduced stiffness section (240) may assist in relieving stresses from the apparatus (220). The at least one increased diameter structure (280, 284, 286) may assist in controlling the sections of the apparatus (220) upon which stresses are exerted. The at least one radial bearing apparatus (120) may assist in reducing and/or postponing wear which might otherwise be experienced by radial bearings in the apparatus (220).

ADDITIONAL DISCLOSURES

The following are non-limiting, specific embodiments of a radial bearing apparatus and of an apparatus comprising the radial bearing apparatus:

Embodiment A. A radial bearing apparatus comprising:
a housing including a housing bore defining a radial bearing housing surface;
a shaft extending through the housing bore and defining a radial bearing shaft surface; and
a radial bearing contact interface between the radial bearing housing surface and the radial bearing shaft surface for bearing a variable side force applied to the shaft, the radial bearing contact interface including an oblique section in which the radial bearing housing surface and the radial bearing shaft surface are oblique to each other when the side force is zero and progressively increase in contact in an axial direction in response to an increasing magnitude of the side force.

Embodiment B. The radial bearing apparatus of Embodiment A wherein the radial bearing housing surface and the radial bearing shaft surface become less oblique to each other within a range along the oblique section as the side force increases from zero.

Embodiment C. The radial bearing apparatus of Embodiment B wherein the radial bearing shaft surface is on an exterior of the shaft, wherein the side force is applied to the shaft in a side force direction, wherein the radial bearing contact interface extends in the axial direction within the housing bore, and wherein the radial bearing housing surface and the radial bearing shaft surface are oblique to each other in the axial direction along the oblique section.

Embodiment D. A radial bearing apparatus comprising:
a housing defining a housing bore and comprising a radial bearing housing surface within the housing bore;
a shaft extending through the housing bore, wherein the shaft comprises a radial bearing shaft surface on an exterior of the shaft; and
a radial bearing contact interface between the radial bearing housing surface and the radial bearing shaft surface for bearing a side force which is applied to the shaft in a side force direction, wherein the radial bearing contact interface extends in an axial direction for an interface length within the housing bore, wherein the radial bearing contact interface comprises an oblique section, wherein the radial bearing housing surface and the radial bearing shaft surface are oblique to each other in the axial direction along the oblique section of the radial bearing contact interface when the side force is zero, and wherein the radial bearing housing surface and the radial bearing shaft surface become less oblique to each other within a range along the oblique section as the side force increases from zero.

Embodiment E. The radial bearing apparatus any one of Embodiments A through D, further comprising a side force axial position where the side force is applied, wherein the oblique section has a vertex, and wherein the oblique section extends from the vertex toward the side force axial position.

Embodiment F. The radial bearing apparatus of any one of Embodiments A through E wherein a bearing interface angle is defined between the radial bearing housing surface and the radial bearing shaft surface at the vertex of the oblique section and wherein the bearing interface angle decreases within an angular range as the side force increases from zero.

Embodiment G. The radial bearing apparatus of any one of Embodiments A through F wherein the radial bearing apparatus is a component of an apparatus having a primary axis and comprising a shaft, wherein the shaft of the apparatus is tilted relative to the primary axis of the apparatus in a shaft tilt direction, and wherein the shaft tilt direction is opposite to the side force direction.

Embodiment H. The radial bearing apparatus of any one of Embodiments A through G wherein the oblique section is a first oblique section, wherein the radial bearing contact interface further comprises a second oblique section, wherein the radial bearing housing surface and the radial bearing shaft surface are oblique to each other in the axial direction along the second oblique section when the side force is zero, wherein the radial bearing housing surface and the radial bearing shaft surface become less oblique to each other within a first range along the first oblique section as the side force increases from zero, and wherein the radial bearing housing surface and the radial bearing shaft surface become less oblique to each other within a second range along the second oblique section as the side force increases from zero.

Embodiment I. The radial bearing apparatus of Embodiment H, further comprising a side force axial position where the side force is applied, wherein the first oblique section has a first vertex, wherein the first oblique section extends from the first vertex toward the side force axial position, wherein the second oblique section has a second vertex, wherein the second oblique section extends from the second vertex toward the side force axial position, and wherein the second vertex is between the first vertex and the side force axial position.

Embodiment J. The radial bearing apparatus of Embodiment I wherein a first bearing interface angle is defined between the radial bearing housing surface and the radial bearing shaft surface at the first vertex and wherein the first bearing interface angle decreases within a first angular range as the side force increases from zero.

Embodiment K. The radial bearing apparatus of Embodiment I or J wherein a second bearing interface angle is defined between the radial bearing housing surface and the radial bearing shaft surface at the second vertex, wherein the second bearing interface angle decreases within a second angular range as the side force increases from zero, and wherein the first bearing interface angle is smaller than the second bearing interface angle.

Embodiment L. The radial bearing apparatus of any one of Embodiments H through K wherein the radial bearing apparatus is a component of an apparatus having a primary axis and comprising a shaft, wherein the shaft of the apparatus is tilted relative to the primary axis of the apparatus in a shaft tilt direction, and wherein the shaft tilt direction is opposite to the side force direction.

Embodiment M. The radial bearing apparatus of any one of Embodiments H through L wherein the first oblique section has a first oblique section length in the axial direction, wherein the second oblique section has a second oblique section length in the axial direction, and wherein the first oblique section length is greater than the second oblique section length.

Embodiment N. An apparatus for use in a borehole comprising a radial bearing apparatus as described in any one of Embodiments A through M.

Embodiment O. The apparatus of Embodiment N wherein the apparatus has a length and a distal end, wherein a portion of the length of the apparatus comprises a reduced stiffness section, and wherein the radial bearing apparatus is axially located along the length of the apparatus between the reduced stiffness section and the distal end of the apparatus.

Embodiment P. The apparatus of Embodiment O wherein the apparatus further comprises an increased diameter structure, and wherein the increased diameter structure is axially located along the length of the apparatus between the reduced stiffness section and the distal end of the apparatus.

Embodiment Q. The apparatus of Embodiment P wherein the apparatus comprises a bearing assembly comprising the radial bearing apparatus and one or more thrust bearings, wherein the bearing assembly is axially located along the length of the apparatus between the reduced stiffness section and the distal end of the apparatus, and wherein the increased diameter structure is axially located along the length of the apparatus at one of the one or more thrust bearings.

Embodiment R. The apparatus of any one of Embodiments N through Q wherein the radial bearing apparatus is a first radial bearing apparatus and wherein the apparatus further comprises a second radial bearing apparatus as described in any one of Embodiments A through J.

Embodiment S. The apparatus of Embodiment R wherein the one or more thrust bearings are axially located along the length of the apparatus between the first radial bearing apparatus and the second radial bearing apparatus.

Embodiment T. The apparatus of any one of Embodiments N through S wherein the apparatus comprises a drilling motor.

Embodiment U. The apparatus of any one of Embodiments P through T wherein the increased diameter structure is a first increased diameter structure, wherein the apparatus further comprises a second increased diameter structure, and wherein the reduced stiffness section is axially located along the length of the apparatus between the first increased diameter structure and the second increased diameter structure.

Embodiment V. The apparatus of Embodiment U wherein the apparatus comprises a drilling motor, wherein the drilling motor comprises a power section and wherein the second increased diameter structure is axially located along the length of the apparatus at the power section.

Embodiment W. The apparatus of any one of Embodiments N through V wherein the apparatus comprises a transmission section and wherein the reduced stiffness section is axially located along the length of the apparatus at the transmission section.

In this document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

We claim:

1. An apparatus for use in a borehole comprising:
   a length and a distal end, wherein a portion of the length comprises a reduced stiffness section, and
   a radial bearing apparatus axially located along the length between the reduced stiffness section and the distal end, and comprising:
      a housing including a housing bore defining a radial bearing housing surface;
      a shaft extending through the housing bore and defining a radial bearing shaft surface; and
      a radial bearing contact interface between the radial bearing housing surface and the radial bearing shaft surface for bearing a variable side force applied to the shaft, the radial bearing contact interface including an oblique section in which the radial bearing housing surface and the radial bearing shaft surface are oblique to each other when the side force is zero and progressively increase in contact in an axial direction in response to an increasing magnitude of the side force.

2. The apparatus as claimed in claim 1, wherein the radial bearing housing surface and the radial bearing shaft surface become less oblique to each other within a range along the oblique section as the side force increases from zero.

3. The apparatus as claimed in claim 1, wherein the apparatus further comprises an increased diameter structure, and wherein the increased diameter structure is axially located along the length of the apparatus between the reduced stiffness section and the distal end of the apparatus.

4. The apparatus as claimed in claim 3 wherein the apparatus comprises a bearing assembly comprising the radial bearing apparatus and one or more thrust bearings, wherein the bearing assembly is axially located along the length of the apparatus between the reduced stiffness section and the distal end of the apparatus, and wherein the increased diameter structure is axially located along the length of the apparatus at one of the one or more thrust bearings.

5. The apparatus as claimed in claim 4 wherein the radial bearing apparatus is a first radial bearing apparatus and wherein the apparatus further comprises a second radial bearing apparatus.

6. The apparatus as claimed in claim 5 wherein the one or more thrust bearings are axially located along the length of the apparatus between the first radial bearing apparatus and the second radial bearing apparatus.

7. The apparatus as claimed in claim 6 wherein the apparatus comprises a drilling motor.

8. The apparatus as claimed in claim 3 wherein the increased diameter structure is a first increased diameter structure, wherein the apparatus further comprises a second increased diameter structure, and wherein the reduced stiffness section is axially located along the length of the apparatus between the first increased diameter structure and the second increased diameter structure.

9. The apparatus as claimed in claim 8 wherein the apparatus comprises a drilling motor, wherein the drilling motor comprises a power section and wherein the second increased diameter structure is axially located along the length of the apparatus at the power section.

10. The apparatus as claimed in claim 3 wherein the apparatus comprises a transmission section and wherein the reduced stiffness section is axially located along the length of the apparatus at the transmission section.

11. An apparatus for use in drilling a borehole comprising:
a housing having a housing bore;
a shaft extending through the housing bore and having a protruding length which extends from the housing toward a distal end of the apparatus;
a drill bit connected with the shaft at the distal end of the apparatus; and
a bearing assembly for rotatably supporting the shaft within the housing, wherein the bearing assembly comprises a radial bearing apparatus, wherein the radial bearing apparatus comprises:
a radial bearing housing surface defined by the housing bore;
a radial bearing shaft surface defined by the shaft; and
a radial bearing contact interface between the radial bearing housing surface and the radial bearing shaft surface and extending in an axial direction within the housing bore for bearing a variable side force applied to the shaft, the radial bearing contact interface including an oblique section in which the radial bearing housing surface and the radial bearing shaft surface are oblique to each other in the axial direction along the oblique section when the side force is zero and become less oblique to each other within a range along the oblique section as the side force increases from zero and progressively increase in contact in the axial direction in response to an increasing magnitude of the side force,
the oblique section being provided at least in part by a taper of the radial bearing shaft surface, wherein the taper comprises a narrowing section of the shaft.

12. The apparatus as claimed in claim 11, further comprising a side force axial position where the side force is applied, wherein the oblique section has a vertex, and wherein the oblique section extends from the vertex toward the side force axial position.

13. The apparatus as claimed in claim 12, wherein a bearing interface angle is defined between the radial bearing housing surface and the radial bearing shaft surface at the vertex of the oblique section and wherein the bearing interface angle decreases within an angular range as the side force increases from zero.

14. The apparatus as claimed in claim 11, wherein the apparatus has a primary axis, wherein the shaft is tilted relative to the primary axis in a shaft tilt direction, and wherein the oblique section is provided at least in part by a relative tilt in the shaft tilt direction of the radial bearing shaft surface relative to the radial bearing housing surface.

15. The apparatus as claimed in claim 11, wherein the oblique section is a first oblique section, wherein the radial bearing contact interface further comprises a second oblique section, wherein the radial bearing housing surface and the radial bearing shaft surface are oblique to each other in the axial direction along the second oblique section when the side force is zero, wherein the radial bearing housing surface and the radial bearing shaft surface become less oblique to each other within a first range along the first oblique section as the side force increases from zero, and wherein the radial bearing housing surface and the radial bearing shaft surface become less oblique to each other within a second range along the second oblique section as the side force increases from zero.

16. The apparatus as claimed in claim 15, further comprising a side force axial position where the side force is applied, wherein the first oblique section has a first vertex, wherein the first oblique section extends from the first vertex toward the side force axial position, wherein the second oblique section has a second vertex, wherein the second oblique section extends from the second vertex toward the side force axial position, and wherein the second vertex is between the first vertex and the side force axial position.

17. The apparatus as claimed in claim 16, wherein a first bearing interface angle is defined between the radial bearing housing surface and the radial bearing shaft surface at the first vertex and wherein the first bearing interface angle decreases within a first angular range as the side force increases from zero.

18. The apparatus as claimed in claim 17, wherein a second bearing interface angle is defined between the radial bearing housing surface and the radial bearing shaft surface at the second vertex, wherein the second bearing interface angle decreases within a second angular range as the side force increases from zero, and wherein the first bearing interface angle is smaller than the second bearing interface angle.

19. The apparatus as claimed in claim 16, wherein the apparatus has a primary axis, wherein the shaft is tilted relative to the primary axis in a shaft tilt direction, and wherein the oblique section is provided at least in part by a relative tilt in the shaft tilt direction of the radial bearing shaft surface relative to the radial bearing housing surface.

20. The apparatus as claimed in claim 16, wherein the first oblique section has a first oblique section length in the axial direction, wherein the second oblique section has a second oblique section length in the axial direction, and wherein the first oblique section length is greater than the second oblique section length.

21. The apparatus as claimed in claim 16, wherein the oblique section is provided at least in part by a taper of the radial bearing shaft surface, wherein the taper comprises a narrowing section of the shaft.

22. The apparatus as claimed in claim 21, wherein the first oblique section has a first oblique section length in the axial direction, wherein the second oblique section has a second oblique section length in the axial direction, and wherein the first oblique section length is greater than the second oblique section length.

* * * * *